US011445562B2

(12) United States Patent
Fujishiro et al.

(10) Patent No.: US 11,445,562 B2
(45) Date of Patent: Sep. 13, 2022

(54) CELLULAR COMMUNICATION SYSTEM

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 26 days.

(21) Appl. No.: 16/875,751

(22) Filed: May 15, 2020

(65) Prior Publication Data

US 2020/0281038 A1    Sep. 3, 2020

Related U.S. Application Data

(63) Continuation of application No. PCT/JP2018/041646, filed on Nov. 9, 2018.

(60) Provisional application No. 62/652,989, filed on Apr. 5, 2018, provisional application No. 62/630,915, filed on Feb. 15, 2018, provisional application No. 62/586,687, filed on Nov. 15, 2017.

(51) Int. Cl.
*H04W 76/18* (2018.01)
(52) U.S. Cl.
CPC ................... *H04W 76/18* (2018.02)
(58) Field of Classification Search
CPC .... H04W 76/18; H04W 36/305; H04W 76/19
See application file for complete search history.

(56) References Cited

U.S. PATENT DOCUMENTS

| | | | | |
|---|---|---|---|---|
| 2008/0242292 A1* | 10/2008 | Koskela | ............... | H04W 76/19 455/423 |
| 2011/0053586 A1 | 3/2011 | Snow et al. | | |
| 2015/0087313 A1 | 3/2015 | Kim et al. | | |
| 2021/0235533 A1* | 7/2021 | Xu | ........................ | H04W 76/20 |
| 2021/0235537 A1* | 7/2021 | Tseng | ............... | H04W 74/0833 |

OTHER PUBLICATIONS

Catt; "RRC connection re-establishment and resume procedures in NR"; 3GPP TSG-RAN WG2 #99bis; R2-1710279; Oct. 13, 2017; pp. 1-7; Prague, Czech Republic.

* cited by examiner

*Primary Examiner* — Marisol Figueroa
(74) *Attorney, Agent, or Firm* — Studebaker & Brackett PC

(57) ABSTRACT

In a cellular communication system according to one embodiment, a user equipment configured to transmit, to a cellular communication network, a request message requesting to resume a radio connection in a predetermined state where the radio connection is suspended, and a base station configured to receive the request message is configured to transmit, to the user equipment, a response message indicating to establish a new radio connection, without transmitting, to the user equipment, a rejection message rejecting the request message even when a UE context corresponding to the user equipment transmitting the request message is not usable by the base station.

3 Claims, 13 Drawing Sheets

FIG. 9

```
RRCConnectionDualRequest ::=         SEQUENCE {
    criticalExtensions                  CHOICE {
        rrcConnectionDualRequest-r15    RRCConnectionDualRequest-r15-IEs,
        criticalExtensionsFuture        SEQUENCE {}
    }
}

RRCConnectionDualRequest-r15-IEs ::= SEQUENCE {
    rrcConnectionRequest-r8             RRCConnectionRequest-r8-IEs,
    rrcConnectionReestablishment-r8     RRCConnectionReestablishmentRequest-r8-IEs
    dualRequestCause                 DualRequestCause,
    dualRequestCauseList             SEQUENCE (SIZE (1..maxMultipleCause) OF DualRequestCause
}

DualRequestCause ::=                 ENUMERATED {
                                     AerialUE, HighAltitude, OnFlying, HighSpeed, AutomousMode,
                                     X2AvailabilityUnknown,
                                     LowIntrruptionTimeRequired, ApplicationRequest,
                                     VoiceInProgress, PowerSavingPreference,
                                     GeoLocation, MobilityHistory,
                                     SubscriptionLevelGold, SubscriptionLevelSilver,
                                     ...
}
```

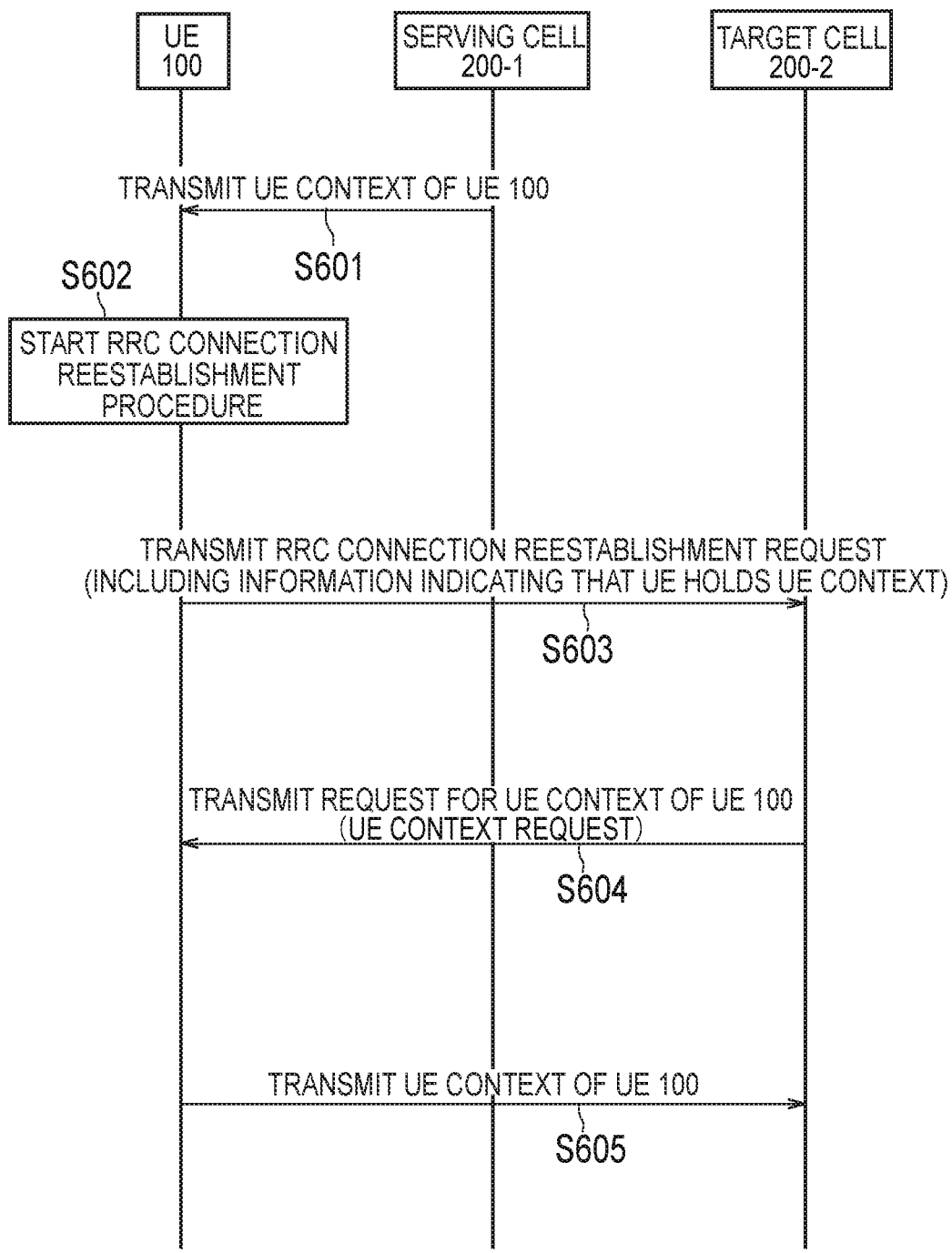

US 11,445,562 B2

CELLULAR COMMUNICATION SYSTEM

RELATED APPLICATIONS

The present application is a continuation based on PCT Application No. PCT/JP2018/041646, filed on Nov. 9, 2018, which claims the benefit of U.S. Provisional Application No. 62/586,687 (filed on Nov. 15, 2017), U.S. Provisional Application No. 62/630,915 (filed on Feb. 15, 2018), and U.S. Provisional Application No. 62/652,989 (filed on Apr. 5, 2018). The content of which is incorporated by reference herein in their entirety.

TECHNICAL FIELD

The present disclosure relates to a cellular communication system.

BACKGROUND ART

In recent years, an unmanned aerial vehicle (UAV) such as a drone has been put into practical use. Research and development for realizing remote monitoring and control of the unmanned aerial vehicle by allowing the unmanned aerial vehicle to cope with cellular communication have been conducted. A user equipment for an aircraft or on-flying may be referred to as an aerial user equipment.

SUMMARY

A cellular communication system according to one embodiment includes a user equipment configured to establish a radio connection with a cellular communication network and perform a cellular communication by using the radio connection. The user equipment is configured to transmit, to the cellular communication network, a request message requesting to resume the radio connection in a predetermined state where the radio connection is suspended. The cellular communication network includes a base station configured to receive the request message. The base station is configured to transmit, to the user equipment, a response message indicating to establish a new radio connection, without transmitting, to the user equipment, a rejection message rejecting the request message even when a UE context corresponding to the user equipment transmitting the request message is not usable by the base station.

A cellular communication system according to one embodiment includes a user equipment configured to establish a radio connection with a cellular communication network and perform a cellular communication by using the radio connection. The user equipment comprises a controller configured to identify a second cell capable of using context information when the controller detects a connection failure with a first cell of the cellular communication network, the context information being information regarding the user equipment and is necessary for reestablishing the radio connection, and a transmitter configured to transmit, to the second cell identified by the controller, a reestablishment request message requesting reestablishment of the radio connection.

A cellular communication system according to one embodiment includes a user equipment configured to establish a radio connection with a cellular communication network and perform a cellular communication by using the radio connection. The user equipment comprises a transmitter configured to transmit, to a cell of the cellular communication network, a message including first request information and second request information, the first request information requesting reestablishment or resuming of the radio connection, the second request information requesting establishment of a new radio connection.

A cellular communication system according to one embodiment is a system performing a conditional handover of a user equipment from a source base station to a target base station. The source base station is configured to transmit, to the target base station, a handover request including context information of the user equipment in advance and transmit, to the user equipment, a handover command in advance. The target base station is configured to transmit, to the source base station, a handover request acknowledgment in response to reception of the handover request. The user equipment is configured to suspend the handover until a handover condition is satisfied after receiving the handover command from the source base station and execute the handover when the handover condition is satisfied. At least one of the handover request, the handover request acknowledgment, and the handover command includes a timer value corresponding to a holding time during which the target base station holds the context information.

A cellular communication system according to one embodiment is a cellular communication system performing a conditional handover of a user equipment from a source base station to a target base station. The source base station is configured to transmit, to a plurality of target base stations, a handover request including context information of the user equipment in advance and transmit, to the user equipment, a handover command in advance. The user equipment is configured to suspend the handover until a handover condition is satisfied after receiving the handover command from the source base station and execute the handover to one target base station of the plurality of target base stations when the handover condition is satisfied. The one target base station is configured to transmit, to the source base station, a first context release notification indicating that the context information of the user equipment is releasable in response to the handover. The source base station is configured to transmit, to a target base station other than the one target base station of the plurality of target base stations, a second context release notification indicating that the context information of the user equipment is releasable in response to reception of the first context release notification.

A cellular communication system according to one embodiment is a cellular communication system performing a conditional handover of a user equipment from a source base station to a target base station. The source base station is configured to transmit, to a plurality of target base stations, a handover request including context information of the user equipment and a base station list regarding the plurality of target base stations in advance and transmit, to the user equipment, a handover command in advance. The user equipment is configured to suspend the handover until a handover condition is satisfied after receiving, from the source base station, the handover command and execute the handover to one target base station of the plurality of target base stations when the handover condition is satisfied. The one target base station is configured to transmit, to the source base station and another target base station corresponding to the base station list, a context release notification indicating that the context information of the user equipment is releasable in response to the handover.

BRIEF DESCRIPTION OF DRAWINGS

FIG. 9 is a diagram illustrating an example of a message (radio resource control (RRC) connection dual request) according to a second embodiment.

FIG. 15 is a diagram illustrating an example of an operation in the fourth embodiment.

DESCRIPTION OF EMBODIMENTS

First Embodiment (Cellular Communication System)

Figure 1:
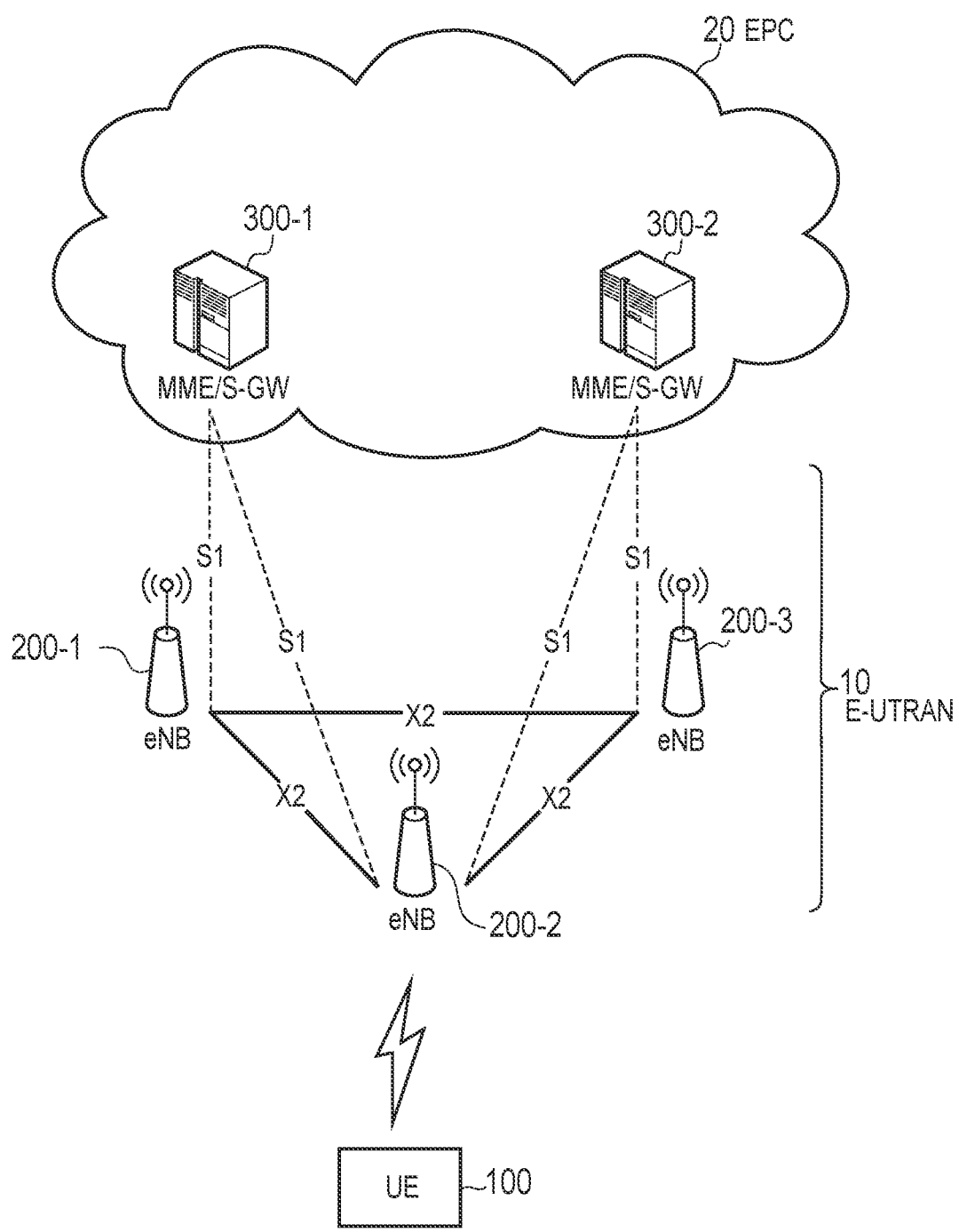
FIG. 1 is a diagram illustrating a configuration of a long term evolution (LTE) system (cellular communication system) according to an embodiment.

A configuration of a cellular communication system according to a first embodiment will be described. FIG. 1 is a diagram illustrating a configuration of a long term evolution (LTE) system which is a cellular communication system according to a first embodiment. The LTE system is a cellular communication system based on a $3^{rd}$ generation partnership project (3GPP) standard.

The LTE system includes a user equipment (UE) 100, a radio access network (evolved-universal mobile telecommunications system (UMTS) terrestrial radio access network (E-UTRAN)) 10, and a core network (evolved packet core (EPC)) 20.

The UE 100 is a mobile communication apparatus. The UE 100 performs radio communication with an evolved Node B (eNB) 200 managing a cell (serving cell) in which the UE 100 exists.

The E-UTRAN 10 includes base stations (evolved Node-Bs (eNBs)) 200. The eNBs 200 are connected to each other through an X2 interface. The eNB 200 manages one or a plurality of cells. The eNB 200 performs radio communication with the UE 100 establishing connection with its own cell. The eNB 200 has a radio resource management (RRM) function, a routing function of user data (hereinafter, simply referred to as "data"), a measurement control function for mobility control/scheduling, and the like. A "cell" is used as a term indicating a minimum unit of a radio communication area. The "cell" is also used as a term indicating a function or a resource that performs radio communication with the UE 100. One cell belongs to one carrier frequency.

The EPC 20 includes a mobility management entity (MME) and a serving gateway (S-GW) 300. The MME performs various mobility control or the like on the UE 100. The MME manages information on a tracking area (TA) in which the UE 100 exists by communicating with the UE 100 using non-access stratum (NAS) signaling. The tracking area is an area composed of a plurality of cells. The S-GW performs data transfer control. The MME and the S-GW are connected to the eNB 200 through an S1 interface.

Figure 2:
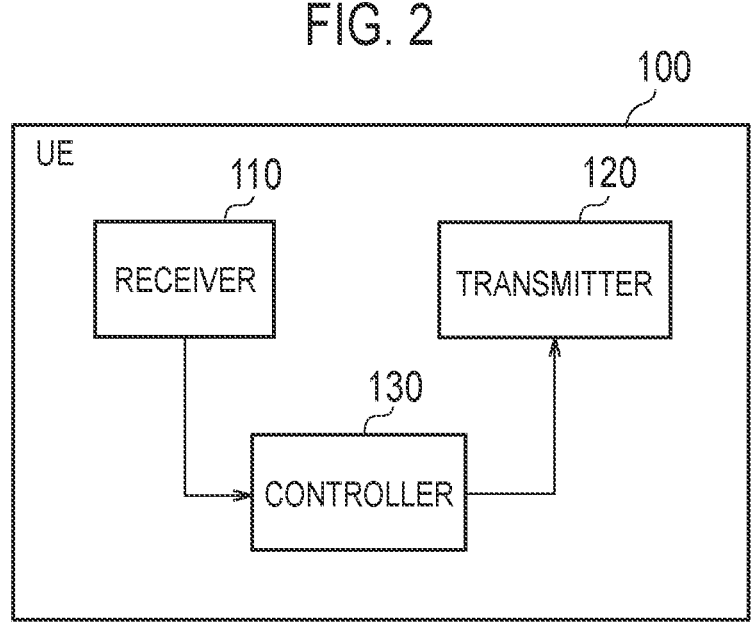
FIG. 2 is a diagram illustrating a configuration of a user equipment (UE) according to the embodiment.

FIG. 2 is a diagram illustrating a configuration of the UE 100 (user equipment). The UE 100 includes a receiver 110, a transmitter 120, and a controller 130.

The receiver 110 performs various reception under the control of the controller 130. The receiver 110 includes an antenna and a receiver. The receiver converts a radio signal received by the antenna into a baseband signal (received signal) and outputs the baseband signal to the controller 130.

The transmitter 120 performs various transmission under the control of the controller 130. The transmitter 120 includes an antenna and a transmitter. The transmitter converts the baseband signal (transmission signal) output from the controller 130 into a radio signal and transmits the radio signal from the antenna.

The controller 130 performs various control in the UE 100. The controller 130 includes at least one processor and a memory. The memory stores a program executed by the processor and information used for a process by the processor. The processor may include a baseband processor and a central processing unit (CPU). The baseband processor performs modulation/demodulation and encoding/decoding of the baseband signal. The CPU performs various processes by executing programs stored in the memory. The processor executes a process to be described later.

Figure 3:
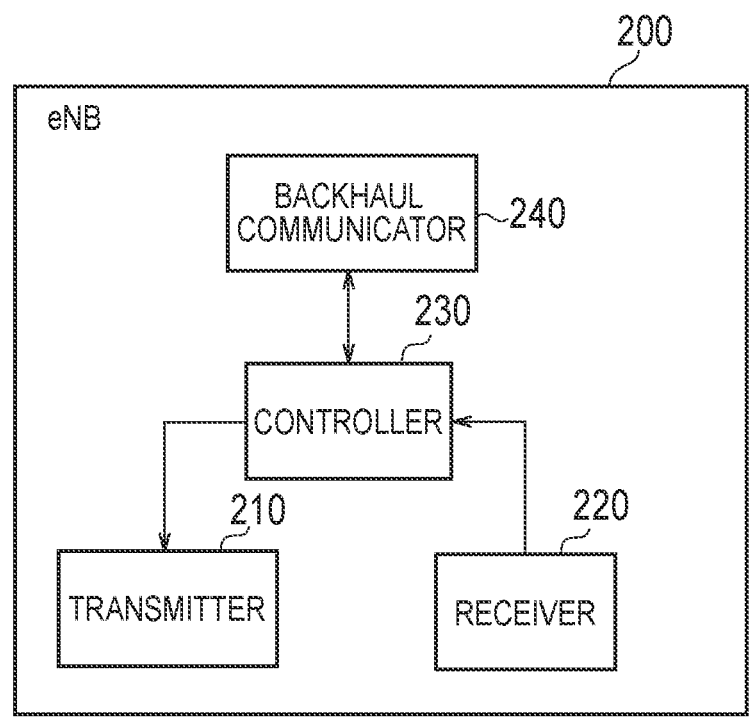
FIG. 3 is a diagram illustrating a configuration of an evolved Node-B (eNB) (base station) according to the embodiment.

FIG. 3 is a diagram illustrating a configuration of the eNB 200 (base station). The eNB 200 includes a transmitter 210, a receiver 220, a controller 230, and a backhaul communication unit 240.

The transmitter 210 performs various transmission under the control of the controller 230. The transmitter 210 includes an antenna and a transmitter. The transmitter converts the baseband signal (transmission signal) output from the controller 230 into a radio signal and transmits the radio signal from the antenna.

The receiver 220 performs various reception under the control of the controller 230. The receiver 220 includes an antenna and a receiver. The receiver converts a radio signal received by the antenna into a baseband signal (received signal) and outputs the baseband signal to the controller 230.

The controller 230 performs various control in the eNB 200. The controller 230 includes at least one processor and a memory. The memory stores a program executed by the processor and information used for a process by the processor. The processor may include a baseband processor and a CPU. The baseband processor performs modulation/demodulation and encoding/decoding of the baseband signal. The CPU performs various processes by executing programs stored in the memory. The processor executes a process to be described later.

The backhaul communicator 240 is connected to a neighboring eNB through an X2 interface. The backhaul communicator 240 is connected to the MME/S-GW 300 through an S1 interface. The backhaul communicator 240 is used for communication performed on the X2 interface, communication performed on the S1 interface, and the like.

Figure 4:
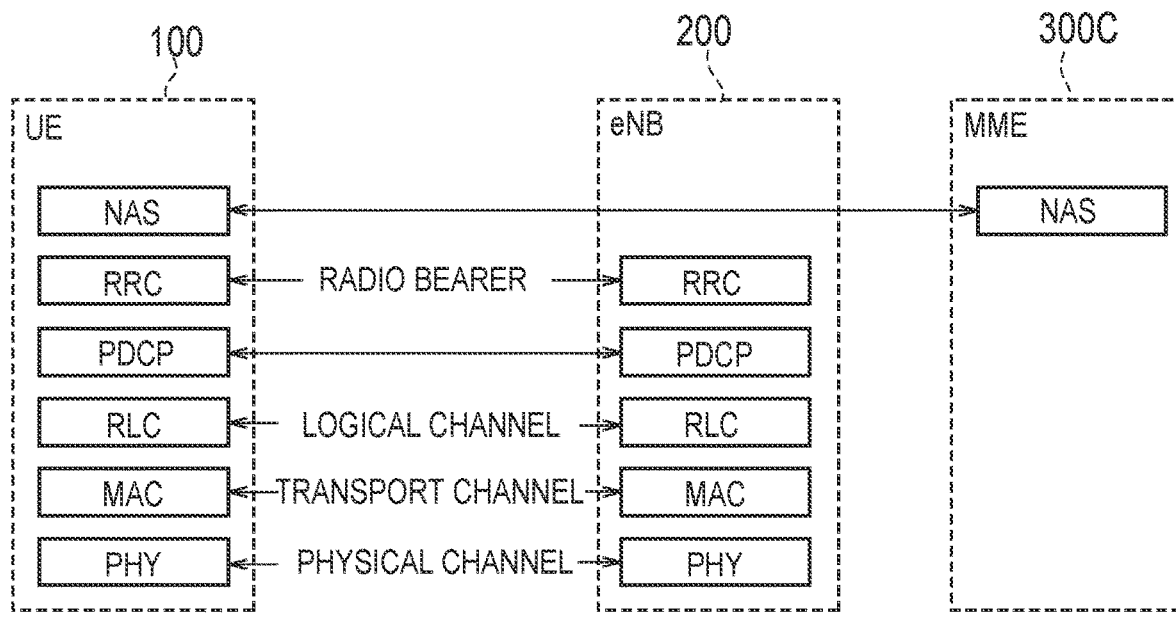
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, a radio interface protocol is divided into first to third layers of an open systems interconnection (OSI) reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 through a physical channel.

The MAC layer performs priority control of data, a retransmission process by hybrid automatic repeat request (HARQ), random access procedure, and the like. Data and control information are transmitted between the MAC layer of the UE 100 and the MAC layer of the eNB 200 through a transport channel. The MAC layer of the eNB 200 includes a scheduler. The scheduler determines transport formats (a transport block size and a modulation and coding scheme (MCS)) of an uplink and a downlink and an allocation resource block to the UE 100.

The RLC layer transmits data to an RLC layer on a receiving side using functions of the MAC layer and the PHY layer. Data and control information are transmitted between the RLC layer of the UE 100 and the RLC layer of the eNB 200 through a logical channel.

The PDCP layer performs header compression/decompression and encryption/decryption.

The RRC layer is defined only in a control plane that handles control information. RRC signaling for various configurations is transmitted between the RRC layer of the UE 100 and the RRC layer of the eNB 200. The RRC layer controls a logical channel, a transport channel, and a physical channel according to establishment, reestablishment, and release of a radio bearer. In a case where there is a connection (RRC connection) between the RRC of the UE 100 and the RRC of the eNB 200, the UE 100 is in an RRC connected mode. In a case where there is no connection (RRC connection) between the RRC of the UE 100 and the RRC of the eNB 200, the UE 100 is in an RRC idle mode.

An NAS layer located higher than the RRC layer performs session management, mobility management and the like. NAS signaling is transmitted between the NAS layer of the UE 100 and an NAS layer of the MME 300C. The UE 100 has a function such as an application layer, in addition to the radio interface protocol.

Figure 5:
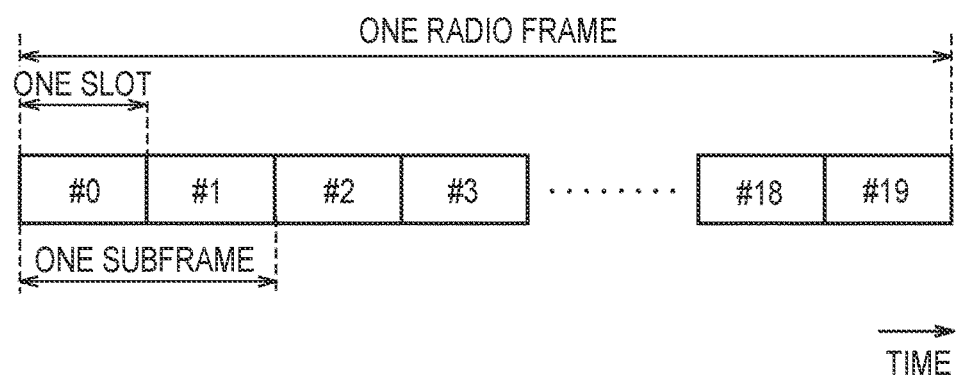
FIG. 5 is a diagram illustrating a configuration of a radio frame of the LTE system according to the embodiment.

FIG. 5 is a diagram illustrating a configuration of a radio frame used in the LTE system. The radio frame is composed of 10 subframes on a time axis. Each subframe is composed of two slots on the time axis. A length of each subframe is 1 ms. A length of each slot is 0.5 ms. Each subframe includes a plurality of resource blocks (RBs) on a frequency axis. Each subframe includes a plurality of symbols on the time axis. Each resource block includes a plurality of subcarriers on the frequency axis. Specifically, twelve subcarriers and one slot are configured in one RB. One resource element (RE) is configured by one symbol and one subcarrier. Frequency resources of radio resources (time/frequency resources) allocated to the UE 100 can be specified by resource blocks, and time resources of the radio resources can be specified by subframes (or slots).

In the downlink, a section of few symbols of a head of each subframe is a region mainly used as a physical downlink control channel (PDCCH) for transmitting downlink control information. The remaining portion of each subframe is a region that can be used mainly as a physical downlink shared channel (PDSCH) for transmitting downlink data.

In the uplink, both end portions in a frequency direction in each subframe are regions mainly used as a physical uplink control channel (PUCCH) for transmitting uplink control information. The remaining portion of each subframe is a region that can be used mainly as a physical uplink shared channel (PUSCH) for transmitting uplink data.

(Applicable Scenario)

In the embodiment, a scenario in which a UE 100 for an unmanned aerial vehicle or on-flying establishes an RRC connection with a cellular communication network (E-UTRAN 10) and performs cellular communication using the RRC connection is assumed. In such a case, the UE 100 may be referred to as an aerial UE or a UAV UE. The UE 100 may be provided in an unmanned aerial vehicle, or the UE 100 itself may be an unmanned aerial vehicle. The unmanned aerial vehicle includes a battery, a global navigation satellite system (GNSS) receiver, and a flight mechanism (for example, a motor and a propeller), in addition to functional blocks illustrated in FIG. 3. Alternatively, the UE 100 may simply be a UE located at a high altitude (for example, a UE on the top floor of a high-rise building).

Figure 6:
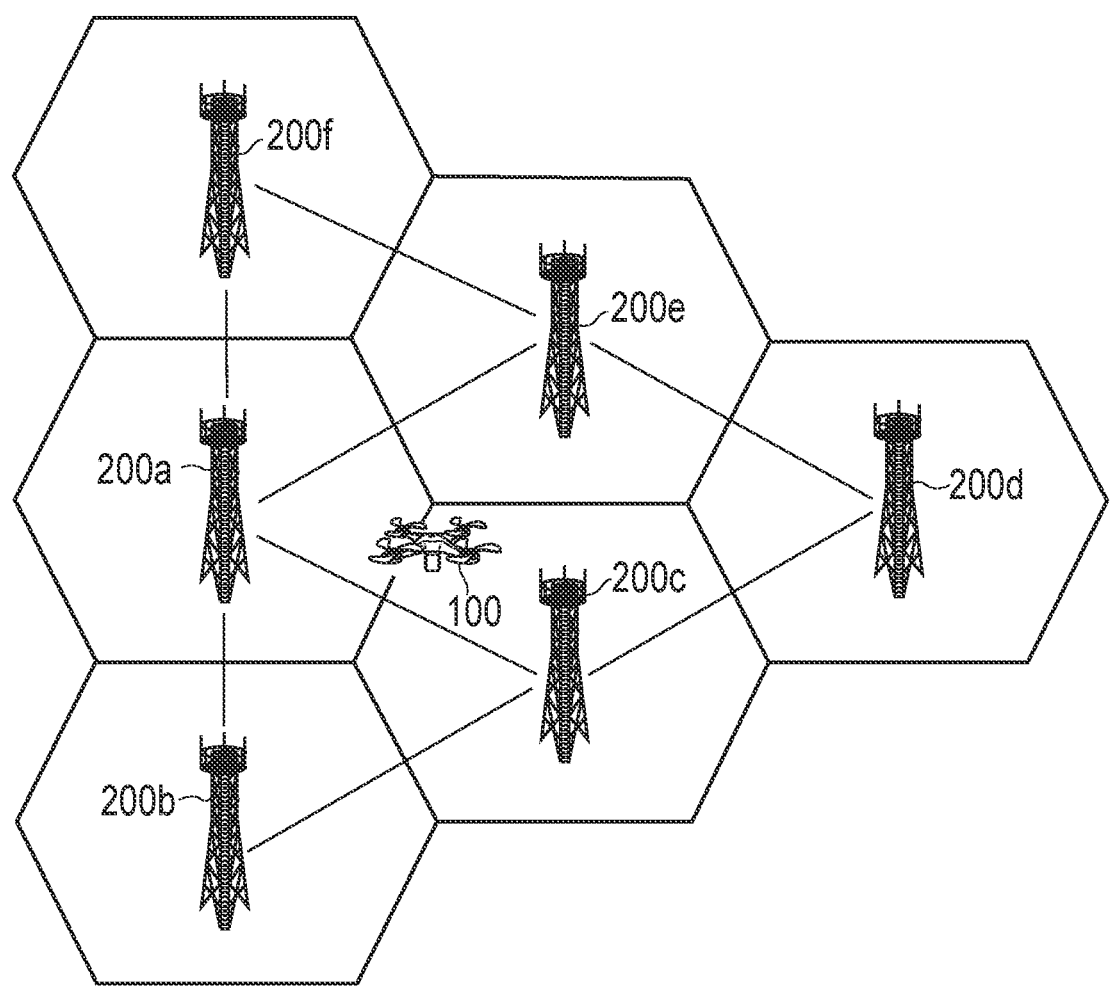
FIG. 6 is a diagram illustrating an example of an application scenario of the cellular communication system according to the embodiment.

FIG. 6 is a diagram illustrating an example of an application scenario of the cellular communication system according to the embodiment.

As illustrated in FIG. 6, the cellular communication system (LTE system) includes a plurality of eNBs 200a to 200f. Each of the plurality of eNBs 200a to 200f forms a hexagonal communication area. Each communication area is composed of one or a plurality of cells. An X2 interface which is an interface between base stations is configured between a pair of eNBs 200 that manage neighboring communication areas. The UE 100 performs cellular communication with the eNB 200 through a cell of a connection destination.

In a current cellular communication network, an area design is made without premising the presence of the aerial UE or the UAV UE, and it is thus easy for a connection failure to occur between the aerial UE or the UAV UE and the cellular communication network. The connection failure refers to a radio link failure (RLF), a handover failure (HOF), and the like. Specifically, in an ordinary cellular communication network, an area is optimized for a UE on a ground (land), and thus, an area is not optimized for a UE in the sky (high altitude). In addition, because the UE in the sky (high altitude) is in line of sight with respect to the eNB and an antenna gain increases as an altitude increases, a radio wave of the eNB flies too far in the sky.

In a case where the UE 100 in an RRC connected mode detects a connection failure with a serving cell, the UE 100 finds a candidate cell, which is a candidate of a new connection destination, by a cell search, and performs the following operation.

First, the UE 100 transmits an RRC Connection Reestablishment Request message for requesting the candidate cell to reestablish an RRC connection to the candidate cell. The RRC Connection Reestablishment Request message corresponds to a reestablishment request message. If the eNB 200 managing this candidate cell can use context information (UE context) of this UE 100, the eNB 200 transmits an RRC Connection Reestablishment message, which is an acknowledgment for the RRC Connection Reestablishment Request message, to the UE 100. The UE context includes identification information of the UE 100, configuration information of the UE 100, and the like.

One eNB can acquire the UE context from another eNB through an X2 interface or an S1 interface. However, it is considered that a range of another eNB from which one eNB can obtain the UE context is limited. In the following, a case where one eNB acquires the UE context from another eNB through the X2 interface is mainly assumed. In such a case, the UE context cannot be exchanged between eNBs that are not connected to each other through the X2 interface. Therefore, if an eNB managing a cell at the time of the connection failure occurrence and an eNB managing a candidate cell found by the cell search are in a relationship of neighboring eNBs, the eNB managing this candidate cell can use the UE context of the UE 100.

In a case where the UE 100 receives the RRC Connection Reestablishment message, the UE 100 reestablishes the RRC connection without transitioning to the RRC idle mode, and maintains the RRC connected mode. On the other hand, in a case where the eNB 200 cannot use the UE context, the eNB 200 transmits an RRC Connection Reestablishment Reject message, which is a negative acknowledgment (reject) for the RRC Connection Reestablishment Request message, to the UE 100.

Second, the UE 100 receiving the RRC Connection Reestablishment Reject message transitions to the RRC idle mode, and searches for a candidate cell again by a cell search.

Third, the UE 100 transitioning to the RRC idle mode transmits an RRC Connection Request message for requesting the candidate cell to newly establish an RRC connection to the candidate cell. The RRC Connection Request message corresponds to a connection request message. The eNB 200 managing this candidate cell transmits an RRC Connection Setup message, which is an acknowledgment for the RRC Connection Request message, to the UE 100 regardless of the presence or absence of the UE context. In a case where the UE 100 receives the RRC Connection Setup message, the UE 100 transitions from the RRC idle mode to the RRC connected mode. In addition, the eNB 200 newly acquires (generates) a UE context.

As such, if a cell of a transmission destination of the RRC Connection Reestablishment Request message can use the UE context, the UE 100 can quickly resume cellular communication while being maintained in the RRC connected mode even though a connection failure occurs. On the other hand, in a case where the cell of the transmission destination of the RRC Connection Reestablishment Request message cannot use the UE context, the UE 100 cannot resume cellular communication if the UE 100 does not perform a search for a new candidate cell, transmission of an RRC connection request, and reception of an RRC Connection Setup message, and an interruption time of the cellular communication is thus increased. Therefore, the UE 100 is desired to transmit an RRC Connection Reestablishment Request message to a cell that can use the UE context.

In an example illustrated in FIG. 6, a UE 100 is located in the sky near boundaries of respective communication areas of an eNB 200a, an eNB 200c, and an eNB 200e. Here, a case where the UE 100 detects an RLF during cellular communication with the eNB 200a is assumed. In such a case, if the UE 100 transmits an RRC Connection Reestablishment Request message to the eNB 200c or eNB 200e, both of the eNB 200c and the eNB 200e have an X2 interface with the eNB 200a, and can thus obtain a UE context from the eNB 200a through the X2 interface.

However, in a case where UE 100 is located in the sky, side lobes of transmission beams of each eNB 200 fly around the sky, such that the UE 100 can receive a radio wave from a distant eNB 200 (for example, an eNB 200d) with strong intensity. For this reason, the UE 100 can select, for example, a cell of the eNB 200d and transmit an RRC Connection Reestablishment Request message to the cell of the eNB 200d. In such a case, since the eNB 200d does not have the X2 interface with the eNB 200a, the eNB 200d cannot acquire the UE context from the eNB 200a through the X2 interface. As a result, the UE 100 fails to reestablish the RRC connection and transitions to the RRC idle mode. The UE 100 needs to perform a search for a new candidate cell, transmission of an RRC connection request, and reception of an RRC Connection Setup message in order to resume cellular communication.

(Operation According to First Embodiment)

As described above, there is a problem that the interruption time of the cellular communication is increased due to the reject of the RRC Connection Reestablishment Request message. In the first embodiment, such a problem can be solved by the following operation.

The UE 100 according to the first embodiment establishes a radio connection with the cellular communication network, and performs the cellular communication using the RRC connection. The UE 100 may be an aerial UE or a UAV UE. For example, information indicating that a category or an attribute of the UE 100 is the aerial UE or the UAV UE may be configured in advance in the UE 100, and the UE 100 having such information may perform the following operation. Alternatively, the UE 100 may perform the following operation in a case a condition indicating that the UE 100 is on flying is satisfied regardless of whether or not the UE 100 is the aerial UE or the UAV UE. The condition indicating that the UE 100 is on flying may be determined according to an altitude and a moving speed of the UE 100 and amounts of variation in the altitude and the moving speed and may be determined according to a type of application (for example, a remote monitoring/control application) that is being executed by the UE 100, for example.

In a case where the controller 130 of the UE 100 detects a connection failure with a first cell of the cellular communication network, the controller 130 of the UE 100 specifies a second cell that can use context information (UE context) that is information related to the UE 100 and is required in order to reestablish an RRC connection. The transmitter 120 of the UE 100 transmits an RRC Connection Reestablishment Request message for requesting the second cell specified by the controller 130 to reestablish the RRC connection to the second cell. Thus, it is possible to prevent the RRC Connection Reestablishment Request message from being rejected, and it is thus possible to solve a problem that the interruption time of the cellular communication is increased.

In order to specify the second cell, the UE 100 autonomously specifies the second cell. The controller 130 of the UE 100 calculates a first value indicating a distance between the first cell in which the connection failure is detected and the UE 100 and a second value indicating a distance between another cell (candidate cell) that can be used by the UE 100 and the UE 100. Path losses can be used as the first value and the second value. The path loss corresponds to a difference between known transmission power of a reference signal and reception power of this reference signal. Alternatively, the controller 130 of the UE 100 may receive location information of the first cell from the first cell, receive location information of the second cell from the second cell, and calculate the first value and the second value on the basis of the received location information and location information (for example, GNSS location information) of the UE 100. The location information includes a longitude, a latitude, and an altitude. In a case where a difference between the first value and the second value is equal to or less than a predetermined value (threshold value), the controller 130 of the UE 100 specifies another cell (candidate cell) as the second cell that is a transmission destination of the RRC Connection Reestablishment Request message. Note that it is assumed that two cells having the same distance (path loss) from the UE 100 neighbor to each other. In the example of FIG. 6, for example, when the UE 100 detects a connection failure with a cell (first cell) of the eNB 200a, the UE 100 can specify a cell of the eNB 200c or the eNB 200e of which path loss is the same as that of the eNB 200a cell as the second cell, and transmit an RRC Connection Reestablishment Request message to the cell of the eNB 200c or the eNB 200e.

However, the UE 100 cannot always find the second cell that can use the UE context. For this reason, in a case where the controller 130 of the UE 100 detects the connection failure with the first cell and another cell that can be used by the UE 100 is not the second cell, the controller 130 of the UE 100 may determine that transmission of the RRC Connection Reestablishment Request message to another cell is skipped. In a case where the transmission of the RRC Connection Reestablishment Request message is skipped, the transmitter 120 of the UE 100 transmits an RRC Connection Request message for requesting another cell to newly establish an RRC connection to another cell. Thus, in a case where it is assumed that the RRC Connection Reestablishment Request message is rejected, it is possible to transmit the RRC Connection Request message instead of the RRC Connection Reestablishment Request message, and it is thus possible to avoid an increase in the interruption time of the cellular communication.

Figure 7:
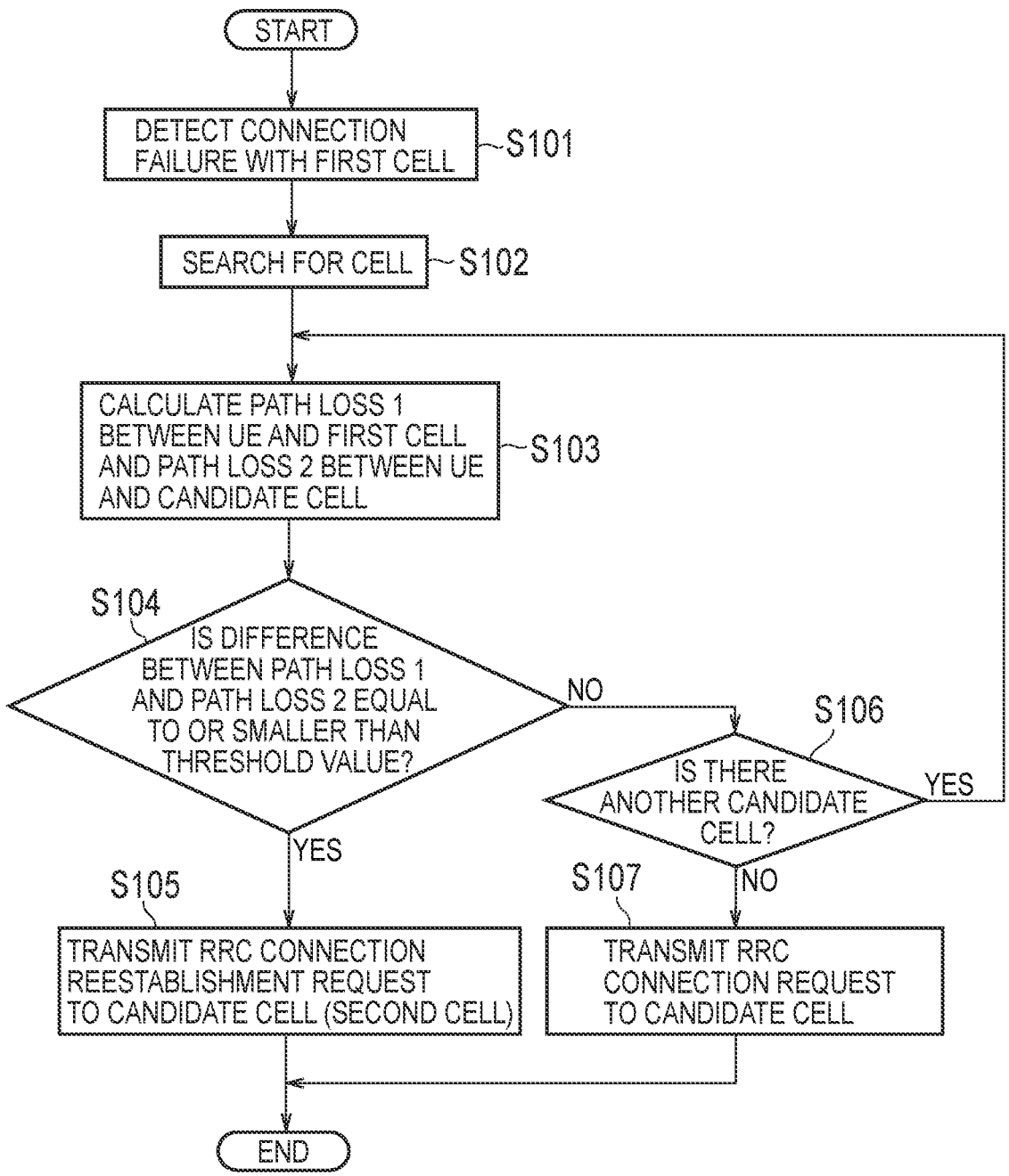
FIG. 7 is a diagram illustrating an example of an operation of a UE in a first embodiment.

FIG. 7 is a diagram illustrating an example of an operation of the UE 100 in the first embodiment.

As illustrated in FIG. 7, in step S101, the UE 100 detects the connection failure with the first cell.

In step S102, the UE 100 performs the cell search to find the candidate cell. The number of candidate cells may be one or may be plural.

In step S103, the UE 100 calculates a path loss 1 between the UE 100 and the first cell and a path loss 2 between the UE 100 and the candidate cell.

In step S104, the UE 100 compares a difference between the path loss 1 and the path loss 2 with a threshold value. This threshold value may be set in the UE 100 from the cellular communication network. For example, the threshold value may be broadcast by a system information block (SIB) from the first cell.

In a case where the difference between the path loss 1 and the path loss 2 is equal to or smaller than the threshold value (YES in step S104), in step S105, the UE 100 specifies a candidate cell corresponding to the path loss 2 as the second cell, and transmits an RRC Connection Reestablishment Request message to the candidate cell.

On the other hand, in a case where the difference between the path loss 1 and the path loss 2 exceeds the threshold value (NO in step S104), in step S106, the UE 100 determines whether or not there is another candidate cell.

In a case where there is another candidate cell (YES in step S106), the UE 100 calculates a path loss 2 for another candidate cell (step S103), and performs determination of step S104.

In a case there is no another candidate cell (NO in step S106), the UE 100 cannot find the second cell that can use the UE context. In such a case, in step S107, the UE 100 transmits an RRC Connection Request message to the found candidate cell.

[Modification of First Embodiment]

In the first embodiment, details of a process in which a second eNB managing the second cell acquires a UE context from a first eNB managing the first cell have not been described. Normally, when the second eNB receives the RRC Connection Reestablishment Request message from the UE 100, the second eNB specifies the first eNB on the basis of this message, and performs notification to the specified first eNB on the X2 interface. The first eNB transfers the UE context to the second eNB through the X2 interface in response to the notification. In such a procedure, due to a time required for acquiring the UE context, a delay time from a time when the second eNB receives the RRC Connection Reestablishment Request message to a time when the second eNB transmits the RRC Connection Reestablishment message is increased. In a modification of the first embodiment, an operation capable of reducing such a delay time will be described.

In the modification of the first embodiment, the first eNB transfers the UE context to the second eNB before the connection failure occurs. That is, the first eNB shares the UE context with the second eNB in advance. For example, when the first eNB acquires the UE context, the first eNB transfers the UE context to another eNB having an X2 interface with the first eNB. Thus, the second eNB can transmit the RRC Connection Reestablishment message as soon as the second eNB receives the RRC Connection Reestablishment Request message from the UE 100.

Figure 8:
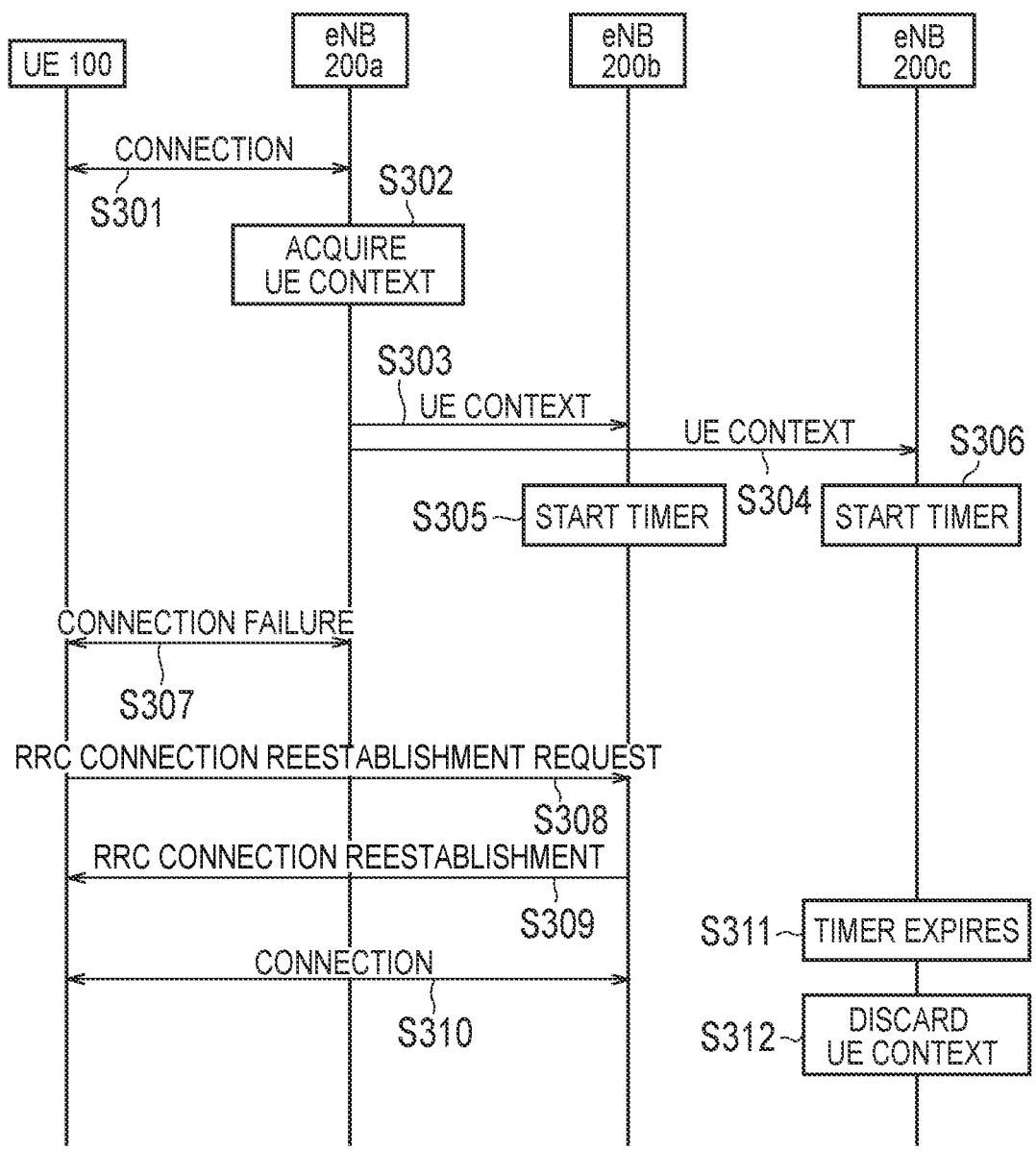
FIG. 8 is a diagram illustrating an example of an operation in a modification of the first embodiment.

FIG. 8 is a diagram illustrating an example of an operation in a modification of the first embodiment.

As illustrated in FIG. 8, in step S301, the UE 100 establishes an RRC connection with the eNB 200a. In step S302, the eNB 200a acquires a UE context. In steps S303 and S304, the eNB 200a transfers the UE context to the eNBs 200b and 200c on the X2 interface.

In steps S305 and S306, the eNBs 200b and 200c start timers at the time of acquiring the UE context. A value of the timer may be a value specified from the eNB 200a, may be a value specified from the MME, or may be a value specified from operations administration and maintenance (OAM). The eNBs 200b and 200c hold the transferred UE context during operations of the timers.

In step S307, a connection failure occurs between the UE 100 and the eNB 200a, and the UE 100 specifies a cell of the eNB 200b as the second cell by the operation according to the first embodiment. In step S308, the UE 100 transmits an RRC Connection Reestablishment Request message to the eNB 200b. The eNB 200b stops the timer in response to reception of the RRC Connection Reestablishment Request message. In step S309, the eNB 200b transmits an RRC Connection Reestablishment message to the UE 100. In step S301, an RRC connection of the UE 100 is reestablished.

On the other hand, in step S311, the timer in the eNB 200c expires. In step S312, the eNB 200c discards the held UE context.

Note that the eNB 200b holds the UE context during the communication with the UE 100. The eNB 200b may transmit an RRC Connection Release message for releasing the RRC connection to the UE 100 according to an end of the communication with the UE 100, and discard the held UE context. The eNB 200b may notify another eNB of the discard of the held UE context on the X2 interface to allow another eNB to discard the UE context.

The operation in the modification example of the first embodiment may be combined with a conditional handover in a third embodiment. For example, the UE context transmitted in steps S303 and S304 may be included in a handover request. Upon receipt of a handover request, the eNB 200*a* may transmit a handover command for the conditional handover to the UE 100 before step S307. In a case where the UE 100 detects an RLF (step S307), the UE 100 may transmit an RRC Connection Reestablishment message while prioritizing a cell specified by the handover command.

Second Embodiment

In a second embodiment, differences from the first embodiment will be mainly described. In the first embodiment, there has been described an example in which the UE 100 selects whether to transmit an RRC Connection Reestablishment Request message or transmit an RRC Connection Request message depending on whether or not a discovered candidate cell is a second cell, thereby preventing the RRC Connection Reestablishment Request message from being rejected.

Meanwhile, the second embodiment introduces a new message having both functions of the RRC Connection Reestablishment Request message and the RRC Connection Request message. This message is a request message requesting at least reestablishment of RRC connection. In the second embodiment, the transmitter 120 of the UE 100 transmits, to a cell of the cellular communication network, a message including first request information requesting reestablishment of the RRC connection and second request information requesting establishment of a new RRC connection.

An eNB 200 (cell) may notify the UE 100 of whether or not to permit transmission of such a message by an SIB (predetermined system information). The UE 100 may transmit such a message to the cell only in a case where the transmission of such a message is permitted. The SIB may be an SIB for an aerial UE. In a case where the UE 100 receives an SIB for an aerial UE from a certain cell, the UE 100 may determine that transmission of an RRC Connection Dual Request message to the cell is permitted.

FIG. 9 is a diagram illustrating an example of a message (RRC connection dual request) according to the second embodiment.

As illustrated in FIG. 9, the RRC Connection Dual Request message according to the second embodiment includes first request information (rrcConnectionReestablishment-r8) for requesting a cell to reestablish an RRC connection and second request information (rrcConnection-Request-r8) for requesting a cell to newly establish an RRC connection, as information elements. The first request information may include all information elements in the RRC Connection Reestablishment Request message. The second request information may include all information elements in the RRC Connection Request message.

The RRC Connection Dual Request message may further include an information element (dual request cause) indicating one or a plurality of causes for transmitting the RRC Connection Dual Request message. In a case where the UE 100 transmits the RRC Connection Dual Request message on the basis of such a cause, the UE 100 includes such a cause as a dual request cause in the RRC Connection Dual Request message. For example, the UE 100 selects at least one of the following information elements, and includes the selected information element in the dual request cause. The number (upper limit or the like) of information elements included in the dual request cause may be notified from the eNB 200 to the UE 100. Information element indicating that the UE is an aerial UE (AerialUE). Information element indicating that an altitude is high (HighAltitude). Information element indicating that the UE is on flying (OnFlying). Information element indicating that the UE is moving at a high speed (HighSpeed). Information element indicating that the UE is being autonomously driven (AutomousMode). Information element indicating that it is unknown whether the X2 interface (UE context) is available (AvailabilityUnknown). Information element indicating that it is required to reduce a communication interruption time (LowIntrruptionTimeRequired). Application request (ApplicationRequest). Information element indicating that a voice is in progress (VoiceInProgress). Information element indicating that power consumption reduction is required (PowerSavingPreference). Geographic location (GeoLocation). Movement history (MobilityHistory). Subscriber class (SubscriptionLevelGold, SubscriptionLevelSilver).

In the second embodiment, a receiver 220 of the eNB 200 receives the RRC Connection Dual Request message from the UE 100. A controller 230 of the eNB 200 determines whether or not the eNB 200 can use a UE context of the UE 100. A criterion for such determination is the same as that in the first embodiment. In a case where the eNB 200 can use the UE context, the controller 230 of the eNB 200 notifies the UE 100 of a response indicating that it is permitted to reestablish the RRC connection as a response to the RRC Connection Dual Request message. On the other hand, in a case where the eNB 200 cannot use the UE context, the controller 230 of the eNB 200 notifies the UE 100 of a response indicating that it is permitted to newly establish an RRC connection as a response to the RRC Connection Dual Request message. Thus, the RRC Connection Dual Request message is not rejected by the eNB 200.

Figure 10:
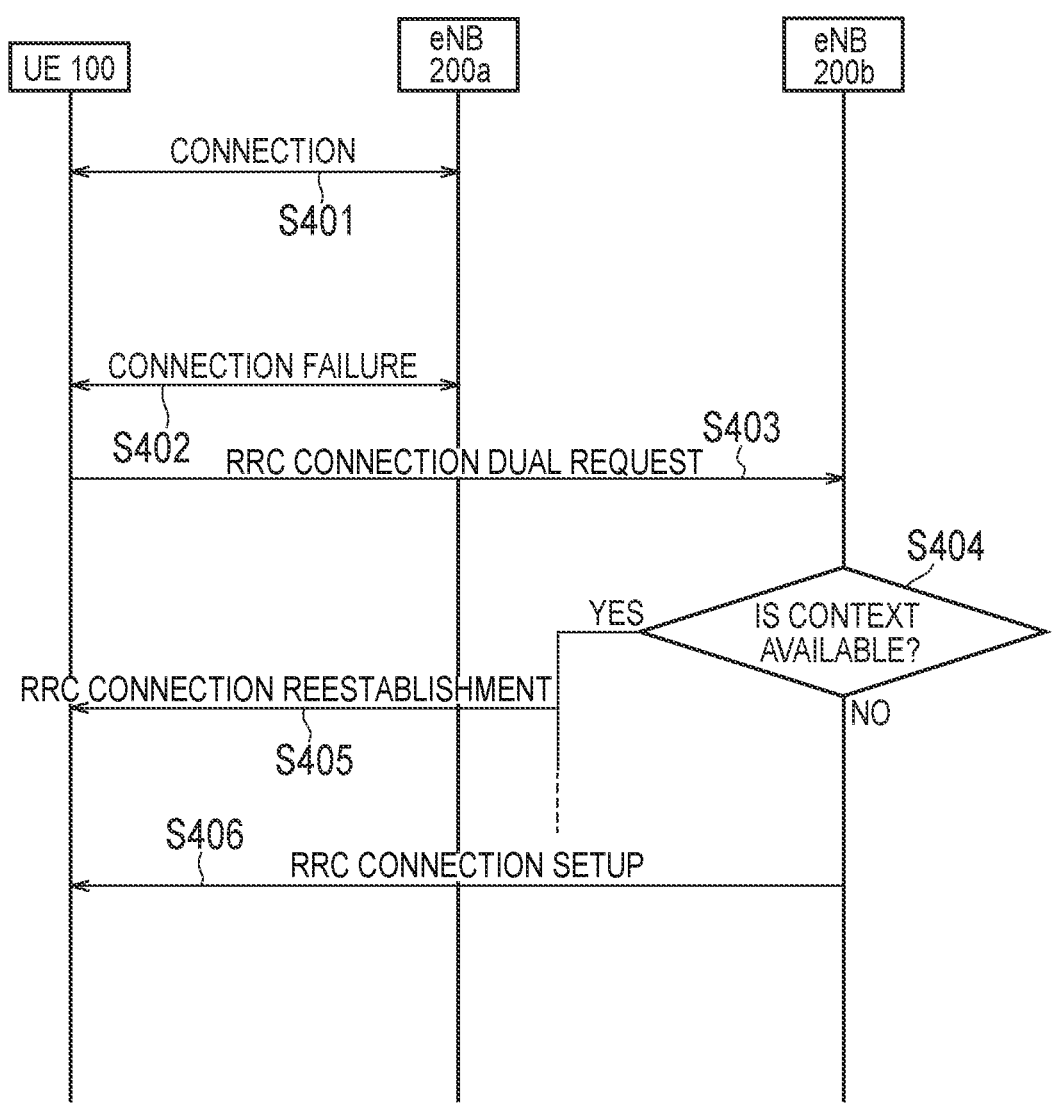
FIG. 10 is a diagram illustrating an example of an operation in the second embodiment.

FIG. 10 is a diagram illustrating an example of an operation in the second embodiment.

As illustrated in FIG. 10, in step S401, the UE 100 establishes an RRC connection with an eNB 200*a*.

In step S402, a connection failure occurs between the UE 100 and the eNB 200*a*, and the UE 100 performs a cell search to find a cell of an eNB 200*b* as a candidate cell.

In step S403, the UE 100 transmits the RRC Connection Dual Request message to the eNB 200*b*.

In Step S404, the eNB 200*b* receiving the RRC Connection Dual Request message determines whether or not the eNB 200*b* can use the UE context of the UE 100.

In a case where the eNB 200*b* can use the UE context (YES in step S404), in step S405, the eNB 200*b* transmits an RRC Connection Reestablishment message to the UE 100.

On the other hand, in a case where the eNB 200*b* cannot use the UE context (NO in step S404), in step S406, the eNB 200*b* transmits an RRC Connection Setup message to the UE 100.

Instead of the RRC Connection Reestablishment message and the RRC Connection Setup message, a common message may be used. The common message may be, for example, an RRC Connection Dual Request Acknowledge message. The eNB 200 includes any one of an information element corresponding to the RRC Connection Reestablishment message and an information element corresponding to the RRC Connection Setup message in the common message.

[First Modification of Second Embodiment]

In the second embodiment, it is assumed that the UE 100 transmitting the RRC Connection Dual Request message is in an RRC connected mode. In a modification of the second embodiment, it is assumed that the UE 100 transmitting the RRC Connection Dual Request message is in an RRC idle mode. Specifically, such a UE 100 is in an RRC suspended state. The RRC suspended state is one state of the RRC idle mode, and is a special state in which the UE context is maintained in a cellular communication network.

The RRC Connection Dual Request message according to a first modification of the second embodiment includes first request information for requesting a cell to restore the RRC connection and second request information for requesting a cell to newly establish an RRC connection, as information elements. The second request information may include all information elements in the RRC Connection Request message, similar to the second embodiment described above.

In the first modification of the second embodiment, the first request information may include all information elements in the RRC Connection Resume Request message. The RRC Connection Resume Request message is a message for the UE 100 in the RRC suspended state to request a cell to recover the RRC connection.

[Second Modification of Second Embodiment]

Although not specifically described in the second embodiment, the UE 100 transmits the RRC Connection Dual Request message during a random access procedure. Specifically, between steps S402 and S403 illustrated in FIG. 10, the UE 100 transmits a random access signal (random access preamble) to the eNB 200b, and the eNB 200b transmits a random access response to the UE 100 in response to reception of the random access signal.

The random access response includes an uplink grant indicating allocation of uplink radio resources. Then, in S403 illustrated in FIG. 10, the UE 100 transmits an RRC Connection Dual Request message to the eNB 200b using uplink radio resources allocated by the uplink grant.

The RRC Connection Dual Request message has a larger amount of information than that of a general RRC Connection Request message. Therefore, the eNB 200b needs to allocate many uplink radio resources (that is, a large data size) to the UE 100 by the uplink grant.

In the second modification of the second embodiment, the UE 100 transmits a random access signal for notifying the eNB 200b of an intention of transmitting the RRC Connection Dual Request message. The eNB 200b transmits the random access response including allocation information (uplink grant) indicating the uplink radio resources used for transmission of the RRC Connection Dual Request message, as a response to the random access signal, to the UE 100. The UE 100 transmits the RRC Connection Dual Request message to the eNB 200b using the uplink radio resources allocated by the uplink grant.

As such, by transmitting the random access signal for notifying the eNB 200b of the intention of transmitting the RRC Connection Dual Request message, the eNB 200b can allocate an appropriate amount of uplink radio resources to the UE 100 on the basis of the random access signal. Specifically, the eNB 200b allocates uplink radio resources more than an amount of uplink radio resources used for transmission of the general RRC Connection Request message to the UE 100.

The random access signal for notifying the eNB 200b of the intention of transmitting the RRC Connection Dual Request message refers to a random access signal transmitted using a specific preamble sequence (signal sequence) and/or specific time/frequency resources.

For example, the eNB 200b broadcasts information indicating specific preamble sequence candidates (preamble sequence pools) and/or specific time/frequency resource candidates (resource pools) into its own cell by an SIB. The UE 100 having the intention of transmitting the RRC Connection Dual Request message grasps the specific preamble sequence pools and/or the specific time/frequency resource pools on the basis of the SIB, and selects the specific preamble sequence and/or the specific time/frequency resources, and transmits the random access signal. The eNB 200 receiving the random access signal grasps that the UE 100 has an intention of transmitting the RRC Connection Dual Request message on the basis of the preamble sequence and/or time/frequency resources applied to the random access signal.

Third Embodiment

A third embodiment will be described mainly with respect to differences from the first and second embodiments. The third embodiment is an embodiment related to a conditional handover.

In a general handover procedure, an eNB 200 determines a handover of a UE 100. For example, the UE 100 transmits a measurement report related to a radio state to the eNB 200 (source eNB) according to deterioration of a radio state between the UE 100 and the eNB 200 (source eNB) and/or improvement of the radio status between the UE 100 and a target eNB. The eNB 200 determines a handover of the UE 100 on the basis of the measurement report transmitted from the UE 100, and then transmits a handover request including a UE context to a target eNB. When the eNB 200 (source eNB) receives a handover request acknowledgment from the target eNB, the eNB 200 (source eNB) transmits a handover command to the UE 100. When the UE 100 receives the handover command, the UE 100 executes a handover to the target eNB, and transmits a random access signal to the target eNB.

On the other hand, in a conditional handover procedure, the UE 100 itself determines a handover of the UE 100. Specifically, the eNB 200 transmits a handover request to the target eNB in advance. Here, the number of target eNBs is not limited to one, and may be plural. Therefore, a plurality of target eNBs can receive the handover request. In addition, the eNB 200 (source eNB) transmits a handover command to the UE 100 in advance. After the UE 100 receives the handover command, the UE 100 suspends the handover until a handover condition is satisfied, and executes the handover and transmits a random access signal to one target eNB when the handover condition is satisfied. The handover condition is, for example, that the radio state between the UE 100 and the eNB 200 (source eNB) is deteriorated and/or that the radio state between the UE 100 and the target eNB is improved. The handover condition may be set from the eNB 200, and the setting may be a threshold value of received reference signal quality (reference signal received power (RSRP), reference signal received quality (RSRQ), reference signal-signal to interference noise ratio (RS-SINR), or the like) or may be a threshold value of the number of times of packet retransmission (the number of times of RLC retransmission). Alternatively, the handover condition may be a radio link failure (RLF). That is, the UE detecting the RLF does not recognize that the UE is in the RLF state, but triggers a handover to the target eNB (specifically, starts a random access procedure).

Such a conditional handover is suitable in a case where the radio state between the UE 100 and the eNB 200 (source eNB) is unstable because the eNB 200 (source eNB) does not determine the handover on the basis of the measurement report, and the UE 100 itself decides the handover. In the third embodiment, a case in which the UE 100 is an aerial user equipment (aerial UE) and the conditional handover is applied to the aerial UE will be described. Note that, hereinafter, the source eNB is referred to as a "source eNB 200S" and the target eNB is referred to as a "target eNB 200T".

In the third embodiment, the source eNB 200S transmits a handover request including context information (UE context) of the UE 100 to one or a plurality of target eNBs 200T in advance, and transmits a handover command to the UE 100 in advance. The target eNB 200T transmits a handover request acknowledgment to the source eNB 200S in response to reception of the handover request. After the UE 100 receives the handover command from the source eNB 200S, the UE 100 suspends the handover until a handover condition is satisfied, and executes the handover when the handover condition is satisfied.

Here, since the UE 100 determines an execution timing of the handover, each target eNB 200T does not grasp when the UE 100 executes the handover. Therefore, the plurality of target eNBs 200T can need to hold the UE context until the UE 100 is handed over to their own cells. However, there is a problem that the target eNB 200T that is not selected by the UE 100 continues to hold the UE context even though the UE 100 performs a handover to another target eNB 200T.

In the third embodiment, a timer value corresponding to a holding time for which the target eNB 200T should hold the context information is included in at least one of the handover request, the handover request acknowledgment, and the handover command. Thus, it is possible to appropriately manage the holding time for which the target eNB 200T should hold the context information. For example, the target eNB 200T uses the held UE context for communication with the UE 100 in a case where the UE 100 is handed over to its own cell within the holding time. On the other hand, the target eNB 200T may discard the held UE context in a case where the UE 100 is not handed over to its own cell within the holding time.

(1) First Operation Example

Figure 11:
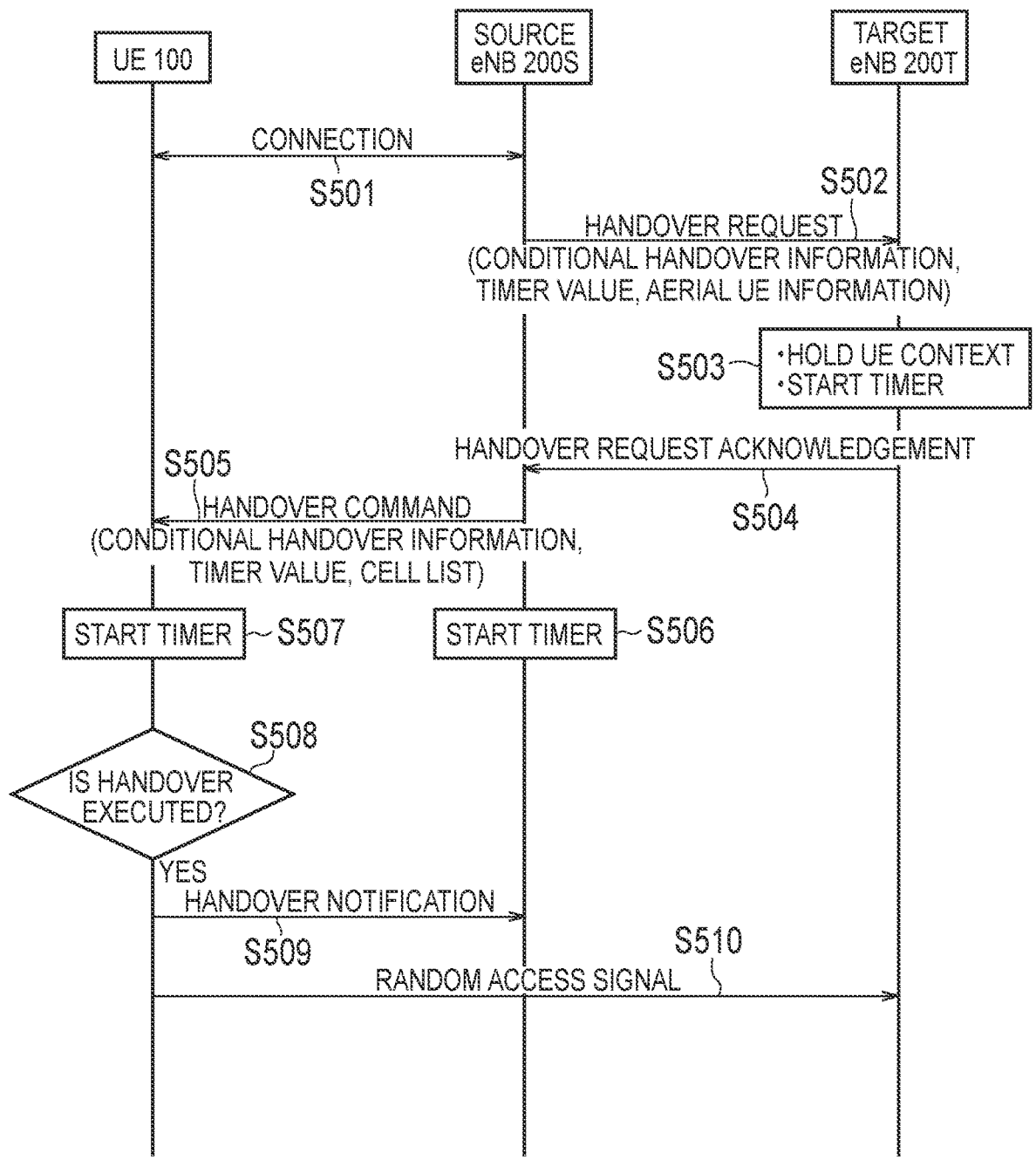
FIG. 11 is a diagram illustrating a first operation example according to a third embodiment.

FIG. 11 is a diagram illustrating a first operation example according to the third embodiment.

As illustrated in FIG. 11, in step S501, the UE 100 (aerial UE) in an RRC connected mode establishes a radio connection (RRC connection) with a cell of the source eNB 200S.

In step S502, the source eNB 200S transmits a handover request message for a conditional handover to the target eNB 200T on an inter-base station interface (X2 interface).

The target eNB 200T may be a neighboring eNB neighboring to the source eNB 200S. The source eNB 200S may transmit a handover request to the target eNB 200T when the UE 100 is connected to its own cell. The source eNB 200S may transmit the handover request to a plurality of eNBs (a plurality of target eNBs).

The handover request message includes a UE context. The handover request message may be a new message dedicated to a conditional handover. Alternatively, the handover request message may be an existing handover request message including information (information element) indicating a conditional handover.

In the first operation example, the source eNB 200S determines a holding time for which the target eNB 200T should hold the context information, and includes a timer value corresponding to the determined holding time in the handover request message. For example, the source eNB 200S determines the holding time on the basis of statistical information and/or a moving speed of the UE 100.

The source eNB 200S may include information indicating that the UE 100 is an aerial UE in the handover request message. For example, this information may be information indicating that a category or an attribute is an Aerial UE, may be information indicating that the UE is on flying, and may be information indicating that a running application of the UE 100 is a type for the aerial UE (for example, remote monitoring/control application). In such a case, the target eNB 200T determines radio resources to be allocated to the UE 100 on the basis of aerial UE information. For example, the target eNB 200T may allocate a frequency band dedicated to the aerial UE, or may divide one frequency band into a plurality of subbands and allocate a subband dedicated to the aerial UE.

When the target eNB 200T receives the handover request message, the target eNB 200T holds the UE context included in the handover request message in step S503. In addition, the target eNB 200T starts a timer in which the timer value included in the handover request message is set.

In step S504, the target eNB 200T transmits a handover request acknowledgment (Ack) message to the source eNB 200S on the X2 interface.

When the source eNB 200S receives the handover request acknowledgment message, the source eNB 200S transmits a handover command (RRC connection reconfiguration message) including information (information element) indicating the conditional handover to the UE 100 in step S505. The handover command may include information specifying a handover condition, which is a condition in which the UE 100 should execute the handover.

The source eNB 200S includes a timer value corresponding to the holding time in the handover command. In addition, the source eNB 200S includes a cell list indicating a plurality of cells of handover targets (that is, cells of one or a plurality of target eNBs 200T) in the handover command. A timer value may be associated with each cell in the cell list. In such a case, a different timer value can be set for each cell in the cell list.

In step S506, the source eNB 200S starts a timer in which the timer value is set. A process of step S506 may be performed between step S504 and step S505.

When the UE 100 receives the handover command, the UE 100 recognizes that the conditional handover is instructed, and starts a timer in which the timer value included in the handover command is set in step S507. In a case where the timer value is provided for each cell, the UE 100 manages the timer value (holding time) for each cell.

In step S508, the UE 100 determines whether or not the handover condition has been satisfied. The UE 100 may make such a determination only on the cells in the cell list. Here, a description will be made on the assumption that the handover condition has been satisfied.

In a case where the UE 100 executes the handover within the holding time corresponding to the timer value, the UE 100 transmits a notification indicating the execution of the handover (handover execution notification) to the source eNB 200S in step S509. The source eNB 200S grasps that the UE 100 executes the handover on the basis of the handover execution notification. The handover execution notification may include information indicating a cell selected as a handover destination (that is, a transmission destination of a random access signal) by the UE 100. The source eNB 200S may transmit a response to the handover execution notification to the UE 100.

In step S510, the UE 100 starts a random access procedure for the cell (target eNB 200T) selected as the handover destination, and transmits the random access signal to the cell.

Here, an example in which the handover is executed within the holding time has been described, but in a case where the timer expires (a holding time elapses) without executing the handover within the holding time, the UE 100 and the source eNB 200S may switch from the conditional handover to a normal handover (eNB initiated handover). In a case where the UE 100 switches to the normal handover, the UE 100 may start a measurement reporting procedure. In addition, the target eNB 200T discards the held UE context in a case where the UE 100 is not handed over to its own cell within the holding time.

(2) Second Operation Example

Figure 12:
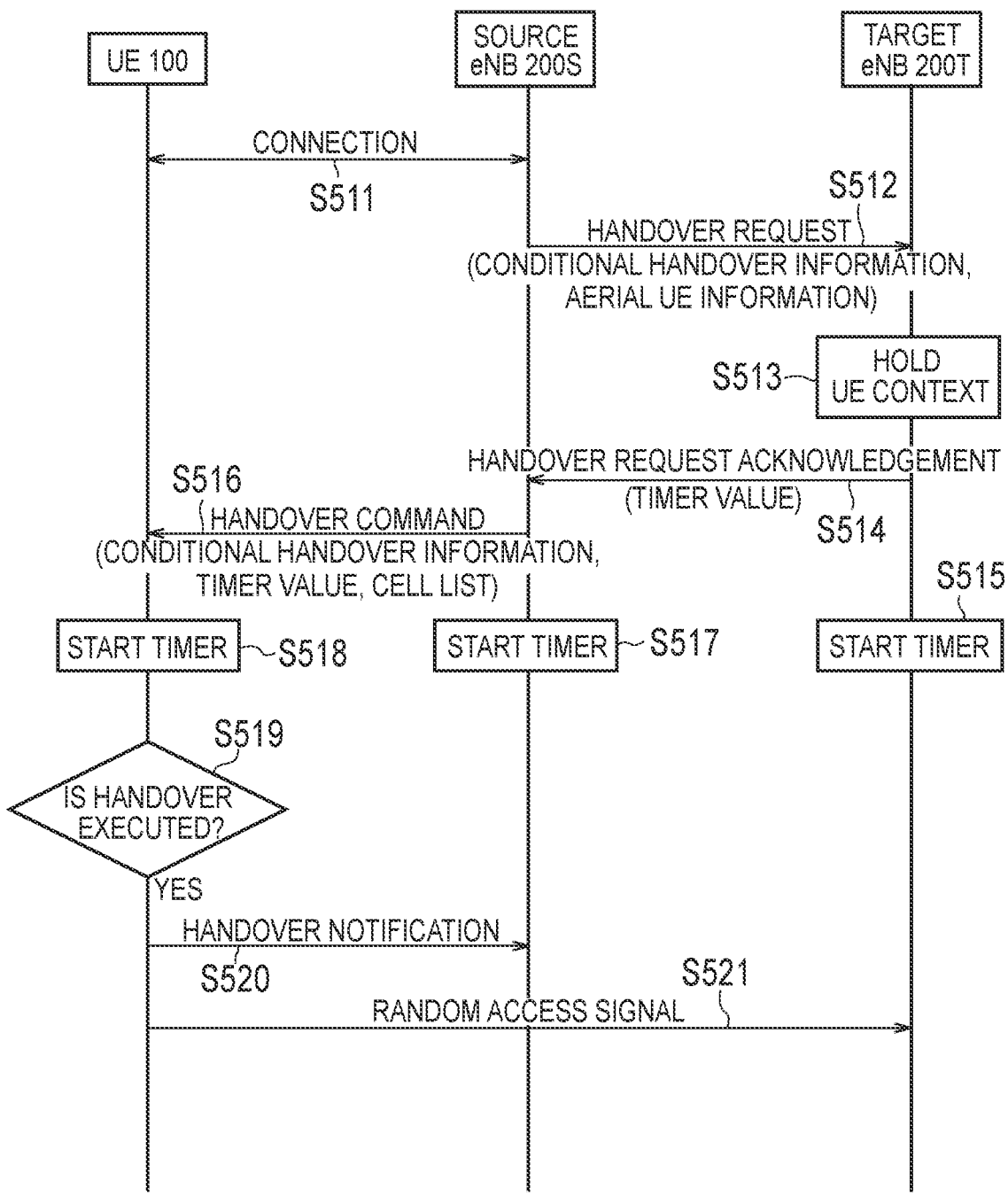
FIG. 12 is a diagram illustrating a second operation example according to the third embodiment.

FIG. 12 is a diagram illustrating a second operation example according to the third embodiment. Here, differences from the first operation example according to the third embodiment will be described. In the second operation example, the timer value is determined by the target eNB 200T instead of the source NB 200S.

As illustrated in FIG. 12, in step S511, the UE 100 (aerial UE) in an RRC connected mode establishes a radio connection (RRC connection) with a cell of the source eNB 200S.

In step S512, the source eNB 200S transmits a handover request message for a conditional handover to the target eNB 200T on an inter-base station interface (X2 interface). The source eNB 200S may transmit the handover request to a plurality of eNBs (a plurality of target eNBs). The source eNB 200S may include information indicating that the UE 100 is an aerial UE in the handover request message.

When the target eNB 200T receives the handover request message, the target eNB 200T holds the UE context included in the handover request message in step S513. In addition, the target eNB 200T determines a holding time for which the target eNB 200T should hold the context information.

In step S514, the target eNB 200T transmits a handover request acknowledgment (Ack) message to the source eNB 200S on the X2 interface. The target eNB 200T includes a timer value corresponding to the determined holding time in the handover request acknowledgment message.

In step S515, the target eNB 200T starts a timer in which the timer value is set.

When the source eNB 200S receives the handover request acknowledgment message, the source eNB 200S stores the timer value included in the handover request acknowledgment message. In step S516, the source eNB 200S transmits a handover command (RRC connection reconfiguration message) including information (information element) indicating the conditional handover to the UE 100. Subsequent operations (steps S517 to S521) are similar as those in the first operation example.

[First Modification of Third Embodiment]

In the third embodiment, an example in which the problem that the target eNB 200T that is not selected by the UE 100 in the conditional handover continues to hold the UE context is solved using the timer has been described. In first and second modifications of the third embodiment, such a problem is solved using a context release notification (UE Context Release), which is a message between base stations.

In a first modification of the third embodiment, the source eNB 200S transmits a handover request including context information of the UE 100 to a plurality of target eNBs 200T in advance, and transmits a handover command to the UE 100 in advance. After the UE 100 receives the handover command from the source eNB 200S, the UE 100 suspends the handover until a handover condition is satisfied, and executes a handover to one target eNB 200T of the plurality of target eNBs 200T when the handover condition is satisfied. This one target eNB 200T transmits a first context release notification indicating that the context information of the UE 100 can be released to the source eNB 200S according to such a handover. The source eNB 200S transmits a second context release notification indicating that the context information of the UE 100 can be released to a target eNB 200T other than the one target eNB 200T among the plurality of target eNBs 200T in response to reception of the first context release notification.

Figure 13:
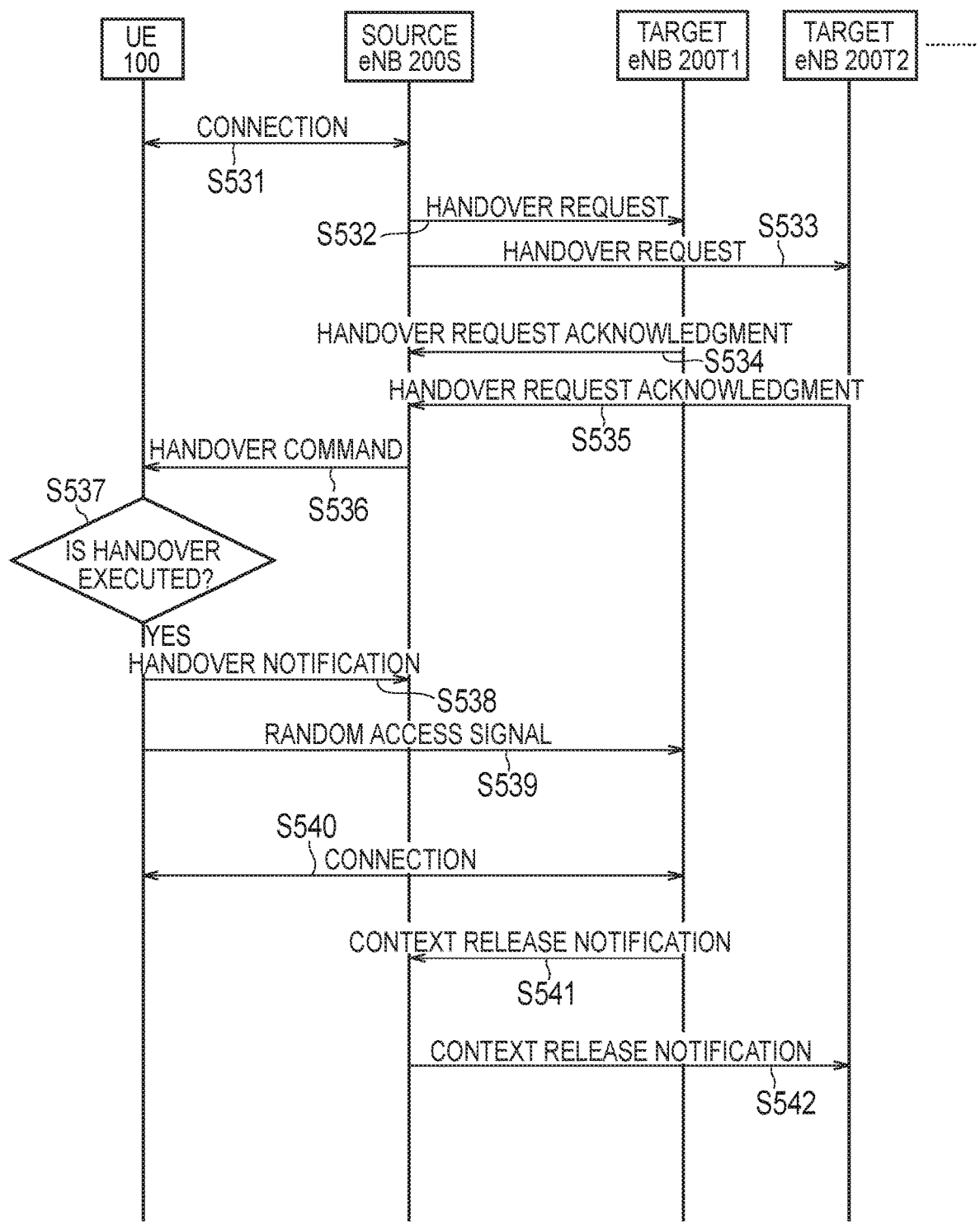
FIG. 13 is a diagram illustrating a first modification of the third embodiment.

FIG. 13 is a diagram illustrating a first modification of the third embodiment. Here, differences from the operations (see FIGS. 11 and 12) according to the third embodiment will be mainly described.

As illustrated in FIG. 13, in step S531, the UE 100 (aerial UE) in an RRC connected mode establishes a radio connection (RRC connection) with a cell of the source eNB 200S.

In steps S532 and S533, the source eNB 200S transmits handover request messages for a conditional handover to the plurality of target eNBs 200T (200T1, 200T2, . . . ) on an inter-base station interface (X2 interface). The handover request message includes a UE context. The handover request message may be a new message dedicated to a conditional handover. Alternatively, the handover request message may be an existing handover request message including information (information element) indicating a conditional handover. The source eNB 200S may include information indicating that the UE 100 is an aerial UE in the handover request message. When each target eNB 200T receives the handover request message, each target eNB 200T holds the UE context included in the handover request message.

In steps S534 and S535, each target eNB 200T transmits a handover request acknowledgment (Ack) message to the source eNB 200S on the X2 interface.

When the source eNB 200S receives the handover request acknowledgment message from each target eNB 200T, the source eNB 200S transmits a handover command (RRC connection reconfiguration message) including information (information element) indicating the conditional handover to the UE 100 in step S536. The handover command may include information specifying a handover condition, which is a condition in which the UE 100 should execute the handover. The source eNB 200S includes a cell list indicating a plurality of cells of handover targets (that is, cells of the plurality of target eNBs 200T) in the handover command.

After the UE 100 receives the handover command, the UE 100 determines whether or not the handover condition has been satisfied. The UE 100 may make such a determination only on the cells in the cell list. Here, a description will be made on the assumption that the handover condition has been satisfied for the target eNB 200T 1.

In a case where the UE 100 executes the handover, the UE 100 transmits a notification indicating the execution of the handover (handover execution notification) to the source eNB 200S in step S538.

In step S539, the UE 100 starts a random access procedure for the cell (target eNB 200T1) selected as the handover destination, and transmits the random access signal to the cell.

When the random access procedure is completed, the UE 100 establishes an RRC connection with the target eNB 200T1 in step S540. According to the execution of such handover, the target eNB 200T1 transmits a first context release notification indicating that context information (UE context) of the UE 100 can be released to the source eNB 200S on the X2 interface in step S541.

After the source eNB 200S receives the first context release notification and before the source eNB 200S discards the UE context held by the source eNB 200S, the source eNB 200S transmits a second context release notification indicating that the UE context can be released to the target eNB 200T2 other than the target eNB 200T1, which is a transmission source of the first context release notification, in step S542. Then, the source eNB 200S discards the UE context held by the source eNB 200S. The target eNB 200T2 discards the UE context held by the target eNB 200T2 in response to reception of the second context release notification.

[Second Modification of Third Embodiment]

In a second modification of the third embodiment, the source eNB 200S transmits a handover request including context information of the UE 100 and an eNB list (base station list) related to a plurality of target eNB 200T to the plurality of target eNBs 200T in advance, and transmits a handover command to the UE 100 in advance. After the UE 100 receives the handover command from the source eNB 200S, the UE 100 suspends the handover until a handover condition is satisfied, and executes a handover to one target eNB 200T of the plurality of target eNBs 200T when the handover condition is satisfied. The one target eNB 200T transmits a context release notification indicating that the context information of the UE 100 can be released to the source eNB 200S and the other target eNBs 200T corresponding to the eNB list according to the handover.

Figure 14:
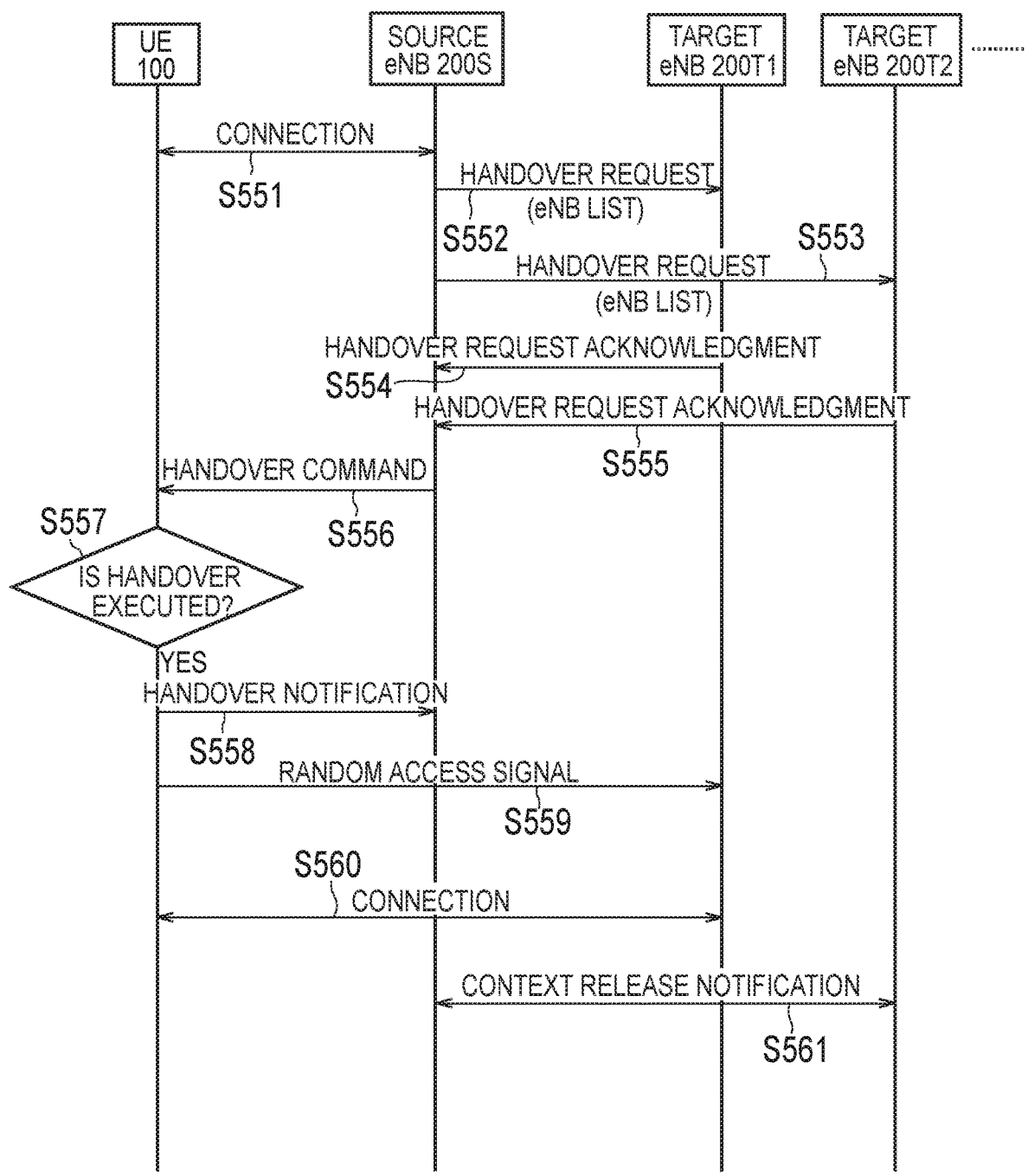
FIG. 14 is a diagram illustrating a second modification of the third embodiment.

FIG. 14 is a diagram illustrating a second modification of the third embodiment. Here, differences from the first modification (see FIG. 13) of the third embodiment will be mainly described.

As illustrated in FIG. 14, in step S551, the UE 100 (aerial UE) in an RRC connected mode establishes a radio connection (RRC connection) with a cell of the source eNB 200S.

In steps S552 and S553, the source eNB 200S transmits handover request messages for a conditional handover to the plurality of target eNBs 200T (200T1, 200T2, . . . ) on an inter-base station interface (X2 interface). The handover request message includes a UE context. In the second modification of the third embodiment, the handover request message includes an eNB list including respective identifiers of the plurality of target eNBs 200T. However, the eNB list transmitted to a certain target eNB 200T may not include an identifier of this target eNB 200T. When each target eNB 200T receives the handover request message, each target eNB 200T holds the UE context and the eNB list included in the handover request message.

Each process in steps S554 to S560 is similar to each process of steps S534 to 540 in FIG. 13.

After the UE 100 establishes an RRC connection with the target eNB 200T1, the target eNB 200T1 transmits a context release notification indicating that context information (UE context) of the UE 100 can be released to the source eNB 200S on the X2 interface in step S561. Further, the target eNB 200T1 transmits a context release notification indicating that the UE context can be released to the target eNB 200T2 on the basis of the eNB list held by the target eNB 200T1 in step S562. Then, the source eNB 200S and the target eNB 200T2 discard the UE context held by themselves.

Fourth Embodiment

In a case where the UE 100 fails in establishment of the RRC connection with a target cell (target eNB) 200-2 due to, for example, occurrence of handover failure, the UE 100 executes RRC Connection Reestablishment Procedure for reestablishing the RRC connection with the target cell 200-2 in order to establish the RRC connection with the target cell 200-2.

Herein, the UE 100 is assumed to be an unmanned aerial vehicle (UAV), but is not limited to a UAV.

Because the UE 100 is a UAV, after the handover failure, the UE 100 reselects a cell far from the serving cell 200-1 connected before the handover failure in the RRC idle mode and then executes the procedure for reestablishing the RRC connection with the cell regarded as the target cell 200-2.

In such a case, there may be no X2 connection between the serving cell 200-1 and the target cell 200-2. In that case, the target cell 200-2 cannot acquire UE Context from the serving cell 200-1 by using the UE Context Fetch via the X2 interface, and thus RRC connection reestablishment failure may occur between the UE 100 and the target cell 200-2. In that case, there is a problem that a time period during which communication of the UE 100 is disconnected increases.

Note that the UE Context (mobile station information) is information necessary for a base station to be reconnected to identify a mobile station when the RRC connection is reestablished (i.e., is reconnected).

The UE Context Fetch means that the base station to be reconnected refers to a base station with which the mobile station has communicated before the radio link failure for the UE Context acquired from the mobile station at the time of a reconnection procedure, thereby identifying the mobile station.

An embodiment that can solve the above problem will be described below with reference to FIG. 15.

The serving cell 200-2 that is RRC connected to the UE 100 transmits the UE Context of the UE 100 to the UE 100 before start of or during a handover procedure from the serving cell 200-1 for the UE 100 to the target cell 200-2 (step S601).

Note that the UE Context transmitted in step S601 may be encapsulated. Specifically, the encapsulated UE Context may be stored in a dedicated container in an RRC message (e.g., RRC Connection Reconfiguration message) and be transmitted from the serving cell 200-1. Note that the encapsulated UE Context may be encrypted. Information such as a key and method for the encryption may be transmitted from a predetermined node to the serving cell 200-2 and the target cell 200-1 before step S601. The information such as the key and method for the encryption may be transmitted from the MME to the serving cell 200-2 and the target cell 200-1 via the S1 interface, or may be set to the serving cell 200-2 and the target cell 200-1 by the OAM.

Note that the UE Context transmitted in step S601 may include a global cell ID of the serving cell 200-1.

After receiving the UE Context of the UE 100, in a case where the handover from the serving cell 200-1 to the target cell 200-2 fails, the UE 100 starts the procedure for reestablishing the RRC connection in order to establish the RRC connection with the target cell 200-1 (step S602).

The UE 100 transmits an RRC Connection Reestablishment Request to the target cell 200-2 (step S603). The UE 100 includes information (indication) indicating that the UE 100 holds the UE Context in the RRC Connection Reestablishment Request to be transmitted.

In a case where the target cell 200-2 cannot acquire the UE Context of the UE 100 from the serving cell 200-1 due to, for example, failure in the UE Context Fetch because there is no X2 connection with the serving cell 200-1, the target cell 200-2 requests the UE 100 to transmit the UE Context (step S604). Note that, in a case where the target cell 200-2 acquires the UE Context of the UE 100 from the serving cell 200-1 by the UE Context Fetch, the target cell 200-2 does not need to request the UE 100 to transmit the UE Context of the UE 100.

Upon receipt of the request to transmit the UE Context from the target cell 200-2 in step S604, the UE 100 transmits the UE Context to the target cell 200-2 (step S605).

Note that, in a case where the UE 100 receives the encapsulated UE Context in step S601, the UE 100 may transmit the encapsulated UE Context as it is to the target cell 200-1 in step S605.

Further, in a case where the UE Context received in step S601 includes the global cell ID of the serving cell 200-1, the UE 100 transmits not only the UE Context of the UE 100 but also the global cell ID of the serving cell 200-1 to the target cell 200-2 in step S605.

Note that, as another embodiment, in a case where the UE 100 is a UAV, the UE 100 may function as a relay point between a plurality of base stations. That is, messages or information generally transmitted and received between base stations by using the X2 interface (load information of each base station, Radio Link Failure Indication (RLF Indication), and the like) may be transmitted and received between a plurality of base stations via the UE 100, instead of using the X2 interface.

Other Embodiments

In the embodiment described above, an example in which the aerial UE or the UAV UE is used has been described. However, the present disclosure is not limited to the aerial UE or the UAV UE. Operations related to the embodiment described above may be applied to Ues other than the aerial UE or the UAV UE. For example, in a vehicle UE, a connection failure can frequently occur during high-speed movement of the vehicle UE, and the operations according to the embodiment described above may thus be applied to the vehicle UE.

In the embodiment described above, the LTE system has been exemplified as the cellular communication system. However, the present disclosure is not limited to the LTE system. The operations according to the embodiment described above may be applied to a cellular communication system (for example, a $5^{th}$ generation (5G) cellular communication system) other than the LTE system.

A program for causing a computer to execute each process performed by the UE 100 and the eNB 200 may be provided. In addition, the program may be recorded on a computer-readable medium. If the computer-readable medium is used, the program can be installed in the computer. Here, the computer-readable medium on which the program is recorded may be a non-transitory recording medium. The non-transitory recording medium is not particularly limited, but may be a recording medium such as a compact disc-read only memory (CD-ROM) or a digital versatile disc-read only memory (DVD-ROM). A chip set including a memory that stores a program for executing each process performed by the UE 100 and the eNB 200 and a processor that executes the program stored in the memory may be provided.

APPENDIX

Introduction

In this appendix, we considered the issue with connection re-establishment which may be considered one of the key functionalities in mobility management.

(Issues with Connection Re-Establishment)

In most cases, especially at high altitudes and high speeds, air handover failure (HOF) rates are higher than terrestrial UEs. It is also pointed out that a flying UE may have different handover characteristics, e.g., faraway handover target cell and several of the contributions have suggested the mobility enhancement for triggering measurement reports related to DL and UL interferences can be based on the number of neighbor cells the UAV observed at the UAV.

When one combines the effect of large HOF and the likelihood for UAVs to consider faraway target cells for handover one potential problem that arises is the possibility of increased connection re-establishment failures. In case of HOF, the UE would perform connection re-establishment and as part of the re-establishment process the UE would perform cell selection. Depending on the number and strengths of the neighbor cells, the existing cell selection procedure may not lead to successful connection re-establishment which will likely lead the UE to declare RLF, since the selected cell may not be a prepared cell, i.e., has valid UE context.

Observation 1: Due to the large number of visible cells, the UAV may select a cell that is unprepared during connection re-establishment.

(Solving Interference Issue can Fix the Problem)

If no X2 interface, S1 handover is assumed and there will be no problem.

Solving interference issues has potential for reducing HOFs, but there are certainly no expectations from the discussions thus far that HOFs can be eliminated. It's even questionable whether HOFs can realistically be reduced to the level experienced by terrestrial UEs. And even if the HOF rate is similar to that of terrestrial UEs, the UAVs will likely experience higher RLF due to the problem described in Observation 1.

Observation 2: Solving interference issues may be able to mitigate HOFs but none of the mechanisms introduced so far is expected to reduce HOFs below those experienced by terrestrial UEs.

if no X2 interface is available, S1 handover cannot be used if the target cell does not have the UE's context during the connection re-establishment procedure and currently UE context fetch is not supported over the S1 interface despite.

Observation 3: Currently S1 interface does not support UE context fetch.

Without the support of UE context fetch over S1, the target cell will need to reject the connection re-establishment request and the UE will subsequently begin to perform NAS recovery. As part of the NAS recovery procedure, the UE will transition to idle state which incurs additional delay versus the RLF handover procedure and, consequently, and incur a longer interruption of service. Additionally, data forwarding and in-order delivery cannot be performed; therefore, all of the data buffered in the source eNB will be lost.

Observation 4: NAS recovery may cause excessive delay and interruption of service.

(Potential Solutions)

In order to realize one of the main objectives of the work item which is to specify enhancements to support improved mobility performance and interference detection, the issue with increased connection re-establishment failure must also be addressed. If UAVs experience excessive number of connection re-establishment failures, any improvements in mobility performance will be limited. The candidate solutions below should be carefully considered.

a) The serving cell provides a list of neighbor cells with X2 interface connection with the serving cell.

b) The serving cell provides a list of neighbor cells that are capable of receiving the UE's context.

c) The UAV may indicate in the re-establishment request with dual re-establishment cause. The first cause is the usual re-establishment request and a prepared target cell may accept the UAV's re-establishment request (legacy). The second cause may be interpreted by the target cell as a new connection request. In case the target cell cannot fetch the UAV's context (due to lack of X2 interface) the target cell does not need to reject the re-establishment request and simply regard this as a new connection request.

d) UE-assisted UE context transfer. During the handover preparation, the serving cell may provide the UE context information to the UAV. The UAV may indicate in the re-establishment request that it has the necessary UE context information. During re-establishment procedure, if the target cell cannot obtain the UE context from the source cell the target cell may request the UE context information from the UAV directly (after the target cell accepts the re-establishment request).

e) Reuse the RRC Connection Resume procedure to reduce interruption time caused by connection re-establishment failure.

f) It was proposed that location based measurement configuration and reporting could be introduced for UAV and a criteria for the UAV to perform and report measurements can be configured based on the distance between the UAV and the candidate cells.

Solution a) is a straightforward way to inform the UAV of the neighbor cells that is capable of fetching the UE context from the source cell (e.g., via the X2 interface). The information may be provided to the UE via broadcast or dedicated signaling. With this solution, the UE should not be required to select the highest ranked cell since the highest ranked cell may not be in this list of neighbor cells with the capability to fetch the UE's context. Instead the highest ranked cell among those on the list could be considered.

Solution b) is similar to Solution a) but in addition to neighbor cells with X2 interfaces to the source cell, the source cell may have the option to transfer UE context to neighbor cells as part of the handover preparation phase, e.g., transfer UE context to neighbor cells based on the measurement reports from the UAV. The source cell may inform the UAV via dedicated signaling those additional cells that may also have UE's context information.

Solution c) is a method for reducing the latency for re-establishment compared to the two-step legacy approach (re-establishment reject followed by a new connection request) and does not require network coordination. If the target cell cannot retrieve the UE's context from the source cell, all of the data buffered in the source eNB will still be lost, which is no different from the legacy case.

With Solution d), the UAV is acting as the relay of its own context information with the target cell, but only when the UE context cannot be fetched from the source cell.

With Solution e), the idea is for the target eNB to extract the Resume ID and ShortResumeMAC-I from the RRC Connection Resume Request. The target eNB contacts the source eNB based on the information in the Resume ID by sending a Retrieve UE Context Request message on X2 interface including the Resume ID, the ShortResumeMAC-I and Cell-ID of target cell, in order to retrieve the UE context including the AS security context. However, it's not clear how this can be accomplished if the target eNB does not have an X2 interface with the source eNB.

Solution f), we believe the idea is that nearby neighbor cells will more likely have X2 interface with the source cell. It isn't clear whether network deployments with X2 interface is strictly distance based. This could potentially exclude certain neighbor cells with X2 interface that may be farther away.

Among all the solutions above, we think Solution c) and Solution f) would have the least specification impact and the least impact to network coordination. Solution f) would likely limit targets cells to those applicable to terrestrial UEs which could limit potential target cells far away from the UAV that may better candidates for serving UAVs (e.g., based on antenna configuration appropriate for UAVs). Solutions a) or b) could also be considered if RAN2 considers the enhanced neighbor cell list (e.g., with X2 interface) and some modifications to the UAV's reselection rule is reasonable for avoiding connection re-establishment failures. Although solution e) is conceptually the most unconventional approach for UE context forwarding, we believe it can play a significant role in reducing network coordination beyond its use for handling re-establishment failures (e.g., coordination for avoiding UL interference).

Proposal: RAN2 should adopt one of the solutions above to handle connection re-establishment failures.

The invention claimed is:

1. A cellular communication system including a user equipment configured to establish a radio connection with a cellular communication network and perform a cellular communication by using the radio connection, wherein:
  the user equipment is configured to transmit, to the cellular communication network, a request message including both a first request information requesting to resume the radio connection in a predetermined state where the radio connection is suspended and a second request information requesting to establish a new radio connection;
  the cellular communication network includes a base station configured to receive the request message; and
  the base station is configured to transmit, to the user equipment, a response message indicating to establish a new radio connection, without transmitting, to the user equipment, a rejection message rejecting the request message even when a UE context corresponding to the user equipment transmitting the request message is not usable by the base station, wherein
  the user equipment is configured to determine whether predetermined system information is broadcast from the base station, the predetermined system information indicating that transmission of the request message including both the first request information and the second request information is permitted, and
  the user equipment is configured to transmit the request message in response to determining that the predetermined system information is broadcast from the base station.

2. A user equipment configured to establish a radio connection with a cellular communication network and perform a cellular communication by using the radio connection, the user equipment comprising:
  a transmitter configured to transmit, to a base station included in the cellular communication network, a request message including both a first request information requesting to resume the radio connection in a predetermined state where the radio connection is suspended and a second request information requesting to establish a new radio connection;
a receiver configured to receive, from the base station, a response message indicating to establish a new radio connection, without receiving, from the base station, a rejection message rejecting the request message even when a UE context corresponding to the user equipment is not usable by the base station, wherein
the user equipment further comprises a controller configured to determine whether predetermined system information is broadcast from the base station, the predetermined system information indicating that transmission of the request message including both the first request information and the second request information is permitted, and
the transmitter is configured to transmit the request message in response to determining that the predetermined system information is broadcast from the base station.

3. A base station included in a cellular communication network configured to establish a radio connection with a user equipment and perform a cellular communication by using the radio connection, the base station comprising:

a receiver configured to receive, from the user equipment, a request message including both a first request information requesting to resume the radio connection in a predetermined state where the radio connection is suspended and a second request information requesting to establish a new radio connection; and
a transmitter configured to transmit, to the user equipment, a response message indicating to establish a new radio connection, without transmitting, to the user equipment, a rejection message rejecting the request message even when a UE context corresponding to the user equipment transmitting the request message is not usable by the base station, wherein
the receiver is configured to receive a random access signal for notifying the base station of an intention of transmitting the request message including both the first request information and the second request information, and
the transmitter is configured to transmit to the user equipment, as a response to the random access signal, allocation information indicating uplink radio resources used for transmission of the request message.

* * * * *